(12) United States Patent
Mayell et al.

(10) Patent No.: US 12,119,743 B2
(45) Date of Patent: Oct. 15, 2024

(54) APPARATUS AND METHODS FOR CONTROLLABLE NETWORKS TO VARY INTER-STAGE POWER TRANSFER IN A MULTI-STAGE POWER CONVERSION SYSTEM

(71) Applicant: Power Integrations, Inc., San Jose, CA (US)

(72) Inventors: Robert J. Mayell, Los Altos, CA (US); Yueming Wang, Gilroy, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 587 days.

(21) Appl. No.: 17/295,199

(22) PCT Filed: Dec. 11, 2019

(86) PCT No.: PCT/US2019/065730
§ 371 (c)(1),
(2) Date: May 19, 2021

(87) PCT Pub. No.: WO2020/123654
PCT Pub. Date: Jun. 18, 2020

(65) Prior Publication Data
US 2021/0399620 A1    Dec. 23, 2021

Related U.S. Application Data

(60) Provisional application No. 62/779,352, filed on Dec. 13, 2018.

(51) Int. Cl.
*H02M 1/42*    (2007.01)
*H02M 1/00*    (2006.01)
(Continued)

(52) U.S. Cl.
CPC ....... *H02M 1/4225* (2013.01); *H02M 1/0035* (2021.05); *H02M 1/0058* (2021.05);
(Continued)

(58) Field of Classification Search
CPC .. H02M 1/4225; H02M 1/007; H02M 1/0035; H02M 1/0058; H02M 3/33571; H02M 3/01; H02M 1/32
See application file for complete search history.

(56) References Cited

U.S. PATENT DOCUMENTS

2010/0066337 A1    3/2010  Gong et al.
2010/0156509 A1    6/2010  Ryu et al.
(Continued)

FOREIGN PATENT DOCUMENTS

| CN | 103532392 A | 1/2014 |
|----|-------------|--------|
| EP | 2991211 A1 | 3/2016 |
| WO | 2005101632 A1 | 10/2005 |

OTHER PUBLICATIONS

PCT Application No. PCT/US2019/065730; International Search Report and Written Opinion of the International Searching Authority; Mar. 12, 2020; 17 pages in all.

(Continued)

*Primary Examiner* — Rafael O De Leon Domenech
(74) *Attorney, Agent, or Firm* — Brian H. Floyd

(57) ABSTRACT

Apparatus and methods for controllable networks to vary inter-stage power transfer in a multi-stage power conversion system are disclosed herein. By using controllable networks (111-113) within the first power converter stage (102), intermediate power delivered to a subsequent or second power converter stage (104) can be varied so that the multi-stage power conversion system (100) may respond to a full load step while offering improved light load power conversion efficiency. A power estimation circuit (122)

(Continued)

within the second power converter stage (104) can provide a control signal (C1-CN) to each of the controllable networks (111-113); the controllable networks (111-113), in turn, can provide network signals (SI, S2) to control the intermediate power delivered to the second power converter stage (104).

41 Claims, 16 Drawing Sheets

(51) Int. Cl.
*H02M 1/32* (2007.01)
*H02M 3/00* (2006.01)
*H02M 3/335* (2006.01)

(52) U.S. Cl.
CPC ............ *H02M 1/007* (2021.05); *H02M 1/32* (2013.01); *H02M 3/01* (2021.05); *H02M 3/33571* (2021.05)

(56) References Cited

U.S. PATENT DOCUMENTS

2011/0080102 A1  4/2011  Ge et al.
2018/0054134 A1* 2/2018  Moon .................... H02M 1/08

OTHER PUBLICATIONS

First Office Action, Chinese Patent Application No. 201980081700.9, Mailed Sep. 30, 2023, 12 pages.
Machine Translation of First Office Action, Chinese Patent Application No. 201980081700.9, Mailed Sep. 30, 2023, 11 pages.
Search Report, Chinese Patent Application No. 201980081700.9, Mailed Sep. 30, 2023, 3 pages.
Machine Translation of Search Report, Chinese Patent Application No. 201980081700.9, Mailed Sep. 30, 2023, 3 pages.
Second Office Action, Chinese Patent Application No. 201980081700.9, Mailed Jun. 20 2024, 4 pages.
Machine Translation of Second Office Action, Chinese Patent Application No. 201980081700.9, Mailed Jun. 20 2024, 5 pages.

* cited by examiner

APPARATUS AND METHODS FOR CONTROLLABLE NETWORKS TO VARY INTER-STAGE POWER TRANSFER IN A MULTI-STAGE POWER CONVERSION SYSTEM

CROSS-REFERENCE TO RELATED APPLICATIONS

This application is a National Stage Entry of International Application No. PCT/US2019/065730 filed on Dec. 11, 2019, which claims the benefit of U.S. Provisional Application No. 62/779,352, filed on Dec. 13, 2018, the contents of which are incorporated herein by reference in their entirety.

FIELD OF THE DISCLOSURE

The present invention relates to controllable networks to vary inter-stage power transfer in a multi-stage power conversion system and more particularly to controllable networks to adjust power delivered to series inductor-inductor capacitor (LLC) converters in a multi-stage alternating current (ac) to direct current (dc) power conversion system.

BACKGROUND INFORMATION

Many electronic devices, such as cell phones, laptops, etc., are powered by direct current (dc) power derived from a power supply. Conventional wall outlets generally deliver a high voltage alternating current (ac) power that needs to be converted to regulated dc power in order to be used as a power source for consumer electronic devices. In some applications a power conversion system may cascade one or more power converter stages including a first stage with power factor correction (PFC) and a second stage with a switch mode power converter. Switch mode power converters are commonly used due to their high efficiency, small size, and low weight to convert a high voltage ac power to a regulated dc power.

One type of switch mode power converter is a resonant converter, which includes a resonant circuit (e.g., inductor(s) and capacitor(s)) as part of a power module. A resonant circuit may advantageously enhance power conversion efficiency by availing zero-current and/or zero-voltage switching.

A subset of resonant converters, the series inductor-inductor capacitor (LLC) converter, uses a resonant circuit with two inductors and one capacitor connected in series to form an LLC resonant circuit. Commonly, an LLC converter is controlled so that power switches perform zero-voltage switching.

BRIEF DESCRIPTION OF THE DRAWINGS

Non-limiting and non-exhaustive embodiments of controllable networks to vary inter-stage power transfer in a multi-stage power conversion system are described with reference to the following figures, wherein like reference numerals refer to like parts throughout the various views unless otherwise specified.

Figure 1:
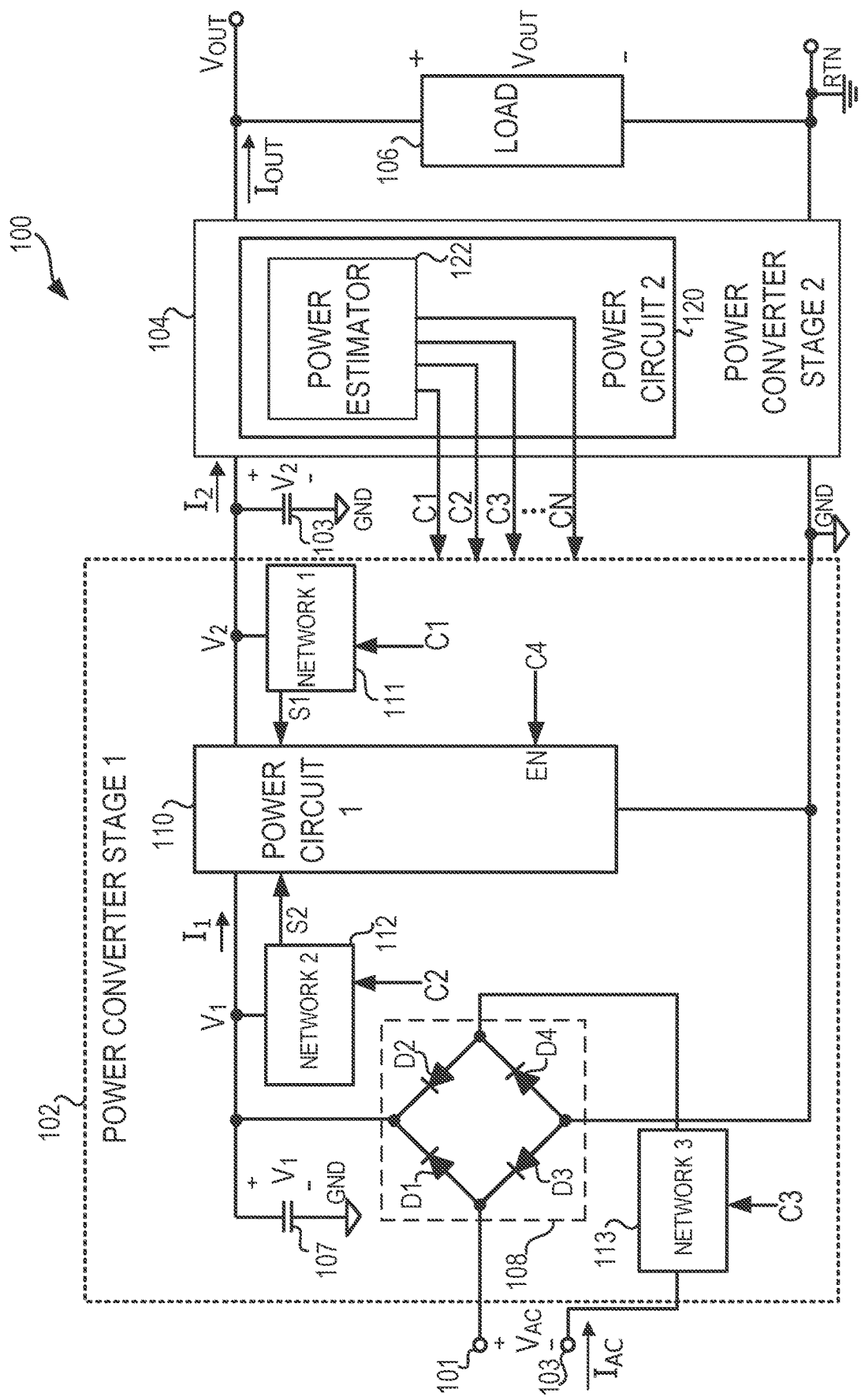
FIG. 1 illustrates a multi-stage power conversion system to deliver output power to a load according to the teachings herein.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the teachings herein. Also, common but well-understood elements that are useful or necessary in a commercially feasible embodiment are often not depicted in order to facilitate a less obstructed view of these various embodiments of controllable networks to vary inter-stage power transfer in a multi-stage power conversion system.

DETAILED DESCRIPTION

In the following description, numerous specific details are set forth in order to provide a thorough understanding of controllable networks to vary inter-stage power transfer in a multi-stage power conversion system. It will be apparent, however, to one having ordinary skill in the art that the specific detail need not be employed to practice the teachings herein. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of controllable networks to vary inter-stage power transfer in a multi-stage power conversion system. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In the context of the present application, when a transistor is in an "off-state" or "off" the transistor blocks current and/or does not substantially conduct current. Conversely, when a transistor is in an "on-state" or "on" the transistor is able to substantially conduct current. By way of example, in one embodiment, a high-voltage transistor comprises an N-channel metal-oxide-semiconductor (NMOS) field-effect transistor (FET) with the high-voltage being supported between the first terminal, a drain, and the second terminal, a source. In some embodiments an integrated controller circuit may be used to drive a power switch when regulating energy provided to a load. Also, for purposes of this disclosure, "ground" or "ground potential" refers to a reference voltage or potential against which all other voltages or potentials of an electronic circuit or Integrated circuit (IC) are defined or measured.

As discussed above multi-stage power conversion systems may use more than one power converter stage to realize a power conversion system (e.g., a power supply). In a multi-stage power conversion system, a first power converter stage may receive ac input power and provide an intermediate power to a subsequent stage connected in cascade. For instance, a first power converter stage may include a power factor correction (PFC) circuit to pre-regulate power delivered to a second power converter stage. The PFC circuit can condition and shape an alternating current (ac) rectified signal to advantageously improve (i.e., increase) the overall power factor.

The second power converter stage may convert the intermediate power to an output power. For instance, as described above the second stage may include a switch-mode power converter. One type of switch-mode power converter is a resonant converter. Resonant converters may be used to advantageously reduce switching losses by availing zero-current switching (ZCS) and/or zero-voltage switching (ZVS).

Also as mentioned above, an LLC converter is a subset of resonant converters. An LLC converter can be controlled to operate at switching frequencies in order to avail zero-voltage switching. Zero-voltage switching (ZVS) is a type of soft switching characterized by the turn-on and turn-off transitions of a switch (e.g., a power field effect transistor (FET) or semiconductor device) occurring at, or substantially near, zero voltage across the switch (e.g., a power FET drain-to-source voltage). In this way voltage related switch losses, can be minimized, or substantially zero during switching transitions thereby reducing switching losses.

The operation of a power converter stage can depend upon loading conditions. For instance, the switching frequency of an LLC converter operating in continuous conduction mode may depend upon output load conditions. Commonly, an LLC converter operates above resonance so that as output load increases, the switching frequency decreases in order to meet a higher power demand.

Higher frequency continuous mode operation in an LLC converter may become limited at light loads; therefore, a light load mode may be utilized to more efficiently provide power once a minimum load threshold level has been detected. For instance, the LLC converter may have a detection circuit capable of determining when the output power demand reaches a minimum power level. Detection of the light load threshold condition may be used to determine when to transition from operating in a continuous mode to operating in a burst mode.

During burst mode, the LLC converter may switch at a fixed frequency for short durations as necessary to maintain an output voltage level. Between the short durations, the switching may be inhibited. Control of switching in this manner in a switch mode power stage is often referred to as "burst" and/or "burst mode". In multi-stage power conversion systems, often during light load (e.g., burst mode and/or burst mode on second power converter) conditions, the preceding first power converter stage may be temporarily disabled to improve overall system efficiency. While the first power converter stage is temporarily disabled, the intermediate power for the second power converter stage (e.g., the LLC converter) may be sourced by a capacitor (e.g., a bulk capacitor). The size of the capacitor, often referred to as a hold-up capacitor, may be selected so that sufficient power is delivered to the second power converter stage (e.g., the LLC converter). The time period during which the first power converter stage is temporarily disabled can be referred to as "hold-up" and/or "ride-through"; and the amount of time that power is sourced only by the bulk capacitor can be referred to as "hold-up" time and/or "ride-through" time.

Turning the preceding first power stage off in order to improve overall system efficiency can become problematic. The power output power capability of the second converter is typically reduced at lower operating input voltages (output from first converter). For instance, a load step can occur when the load transitions from a light load (e.g., burst mode) to a moderate or heavy load condition. When a load step suddenly appears at the output of multi-stage power conversion system, there is a delay time during which the first power converter stage (i.e., the PFC circuit) must be restarted (i.e., enabled). During this time the output voltage remains much lower and it takes time for it to rise sufficiently to allow the second converter to satisfy the output power demand. Due to time delay in enabling the first power converter stage, multi-stage power conversion systems often cannot respond fast enough to accomplish a full load step from burst mode to maximum load (i.e., one-hundred percent maximum output power level).

Accordingly, there is a need for a multi-stage power conversion system which allows for improved efficiency during light and/or burst mode conditions while also being able to respond to a full (one-hundred percent) load step.

Apparatus and methods for controllable networks to vary inter-stage power transfer in a multi-stage power conversion system are disclosed herein. By using controllable networks within the first power converter stage, intermediate power delivered to a subsequent or second power converter stage can be varied so that the multi-stage power conversion system may respond to a full load step while offering improved light load power conversion efficiency. A power estimation circuit within the second power converter stage can provide a control signal to each of the controllable networks; the controllable networks, in turn, can provide network signals (e.g., voltages and/or currents) to control the intermediate power delivered by the first stage to the second power converter stage.

FIG. 1 illustrates a multi-stage power conversion system 100 to deliver output power to a load 106 according to the teachings herein. The multi-stage power conversion system 100 includes a first power converter stage 102, a second power converter stage 104, and a hold-up capacitor 103. The first power converter stage 102 is electrically connected in cascade with the second power converter stage 104 and can convert ac input power (i.e., ac input voltage $V_{AC}$ and ac input current $I_{AC}$) at input terminals 101, 103 into an intermediate power. As shown, the first power converter stage 102 can be electrically cascaded with the second power converter stage 104 and can provide the intermediate power to the second power converter stage 104 with an intermediate voltage $V_2$ with respect to dc ground GND. The hold-up capacitor 103 may be used to store energy and hold the intermediate voltage $V_2$ during ride-through. The second power converter stage 104 can convert intermediate power received at its input (i.e., intermediate voltage $V_2$ and intermediate current $I_2$) into output power (i.e., output voltage $V_{OUT}$ and output current $I_{OUT}$).

The output power may be delivered to the load 106, and the amount of output power may depend upon a load condition. Load conditions can be determined by power demand criteria. For instance, a light load condition may include a condition for which the output current $I_{OUT}$ and/or output power drops below a criterion threshold level (e.g., below ten percent a maximum rating). Additionally, a nominal load condition may include a condition for which the output current $I_{OUT}$ and/or output power is above the criterion threshold.

The first power converter stage 102 includes an ac rectifier 108, a capacitor 107, a first stage power circuit 110, and controllable networks 111-113. The ac rectifier 108 includes four diodes D1-D4 connected in a diode bridge to rectify the ac input power (i.e., ac input voltage $V_{AC}$ and ac input current $I_{AC}$) at input terminals 101, 103. The cathodes of diodes D1 and D2 are electrically connected to capacitor 107 and to an input of the first stage power circuit 110; the anodes of diodes D3 and D4 are electrically connected to dc ground GND. In this way the ac rectified power (i.e., rectified ac input voltage $V_1$) may be referenced to dc ground GND and the capacitor 107 may be used to filter ripple and/or electromagnetic interference (EMI).

Also, as shown in FIG. 1, the first stage power circuit 110 is electrically connected to dc ground GND and it receives rectified ac input power (i.e., rectified ac input voltage $V_1$ and rectified ac input current $I_1$) from the ac rectifier 108. Additionally, an output of the first stage power circuit 110 is electrically connected to an input of the second power converter stage 104. The second power converter stage 104 receives intermediate power (i.e., intermediate voltage $V_2$ and intermediate current $I_2$) converted by the first stage power circuit 110. The hold-up capacitor 103 is connected at the output of the first stage power circuit 110 to store energy and can be used to hold the intermediate voltage $V_2$ during ride-through. Additionally, the intermediate power can be direct current (dc) power.

As shown in FIG. 1, the second power converter stage 104 also includes an output connected to the load 106 and may be connected to both a dc ground GND and an isolated ground RTN. In this way output power delivered to the load 106 may be isolated (e.g., galvanically isolated) from the intermediate power (i.e., intermediate voltage $V_2$ and intermediate current $I_2$). Although, FIG. 1 shows a configuration with an isolated ground RTN, other configurations are possible. For instance, in some configurations the second power converter stage 104 may be configured to use a single (not isolated) ground.

Also, the second power converter stage 104 includes a second stage power circuit 120. The second stage power circuit 120 includes a power estimation circuit 122 which can generate control signals C1-C3, –CN based on a load condition. In some embodiments the control signals C1-C3, CN can be digital signals and can have a load dependent logic value (i.e., a logic high and/or a logic low) depending upon one or more load conditions. For instance, if the power estimation circuit 122 detects that output power (i.e., output voltage $V_{OUT}$ and output current $I_{OUT}$) at the load 106 meets a light load condition, then one or more of the control signals C1-C3, CN may have a logic high (or low) value. Alternatively, if the power estimation circuit 122 detects that the load is operating under a nominal (not light load) condition, then one or more of the control signals C1-C3, CN may have a logic low (or high) value. In other embodiments the control signals C1-C3, CN may be analog signals to provide analog control based on output power level.

The second power converter stage 104 provides one or more of the control signals C1-C3, CN to the first power converter stage 102 where they may be applied to the controllable networks 111-113 to adjust intermediate power (i.e., intermediate voltage $V_2$ and intermediate current $I_2$).

The controllable networks 111-113 may receive and/or sample signals from the first power converter stage 102 (e.g. rectified ac input voltage $V_1$, intermediate voltage $V_2$, rectified ac input current $I_1$, intermediate current $I_2$) in controlling the intermediate power (i.e., intermediate voltage $V_2$ and intermediate current $I_2$). Also, the controllable networks 111-113 may adjust intermediate power in response to one or more of the control signals C1-C3, CN. For instance, controllable network 111 receives control signal C1 and is electrically connected at the output of the first stage power circuit 110. The controllable network 111 can sample the intermediate voltage $V_2$ and provide a network signal S1 which may be used by the first stage power circuit 110 to regulate the intermediate power (e.g., intermediate voltage $V_2$). By using the control signal C1 to adjust the network signal S1, the multi-stage power conversion system 100 can adjust (i.e., vary) the intermediate power based on a load condition. Similarly, as illustrated in FIG. 1, the controllable network 112 can be used to adjust intermediate power by sampling the rectified ac input voltage $V_1$ and providing a network signal S2 to the first stage power circuit 110 based on the control signal C2.

The controllable network 113 may also be configured to control intermediate power in response to the control signal C3. The controllable network 113 is electrically connected between the input terminal 103 and the ac rectifier at the anode of diode D2 and cathode of diode D4. Based on the control signal C3, the controllable network 113 can be used to control and/or adjust the rectified ac input power (i.e., rectified ac input voltage $V_1$ and rectified ac input current $I_1$). By adjusting the rectified ac input power using control signal C3, multi-stage power conversion system 100 can adjust the intermediate power and/or the manner (e.g., conversion efficiency) in which the intermediate power is provided to the second stage power converter 104.

Also, as shown in FIG. 1, control signal C4 may be provided to enable and/or disable the first stage power circuit 110. The control signal C4 can be a logic signal which controls an internal controllable network (not shown) within the first stage power circuit 110. The internal controllable network may provide an internal network signal (also not shown) which causes the first stage power circuit 110 to provide substantially zero output power. For instance the first stage power circuit 110 may operate with high output impedance and/or in a hold-up condition in response to the control signal C4. During hold-up, the second stage power converter 102 may receive intermediate power from the hold-up capacitor 103.

Although the multi-stage power conversion system 100 of FIG. 1 shows an embodiment with a first stage power converter 102 and a second stage power converter 104 using four control signals C1-C4, from a plurality of control signals C1, C2, C3, . . . CN, other configurations are possible. For instance, a multi-stage power conversion system 100 can have greater than two power converter stages and can use greater or fewer control signals to adjust an intermediate power.

Figure 2A:
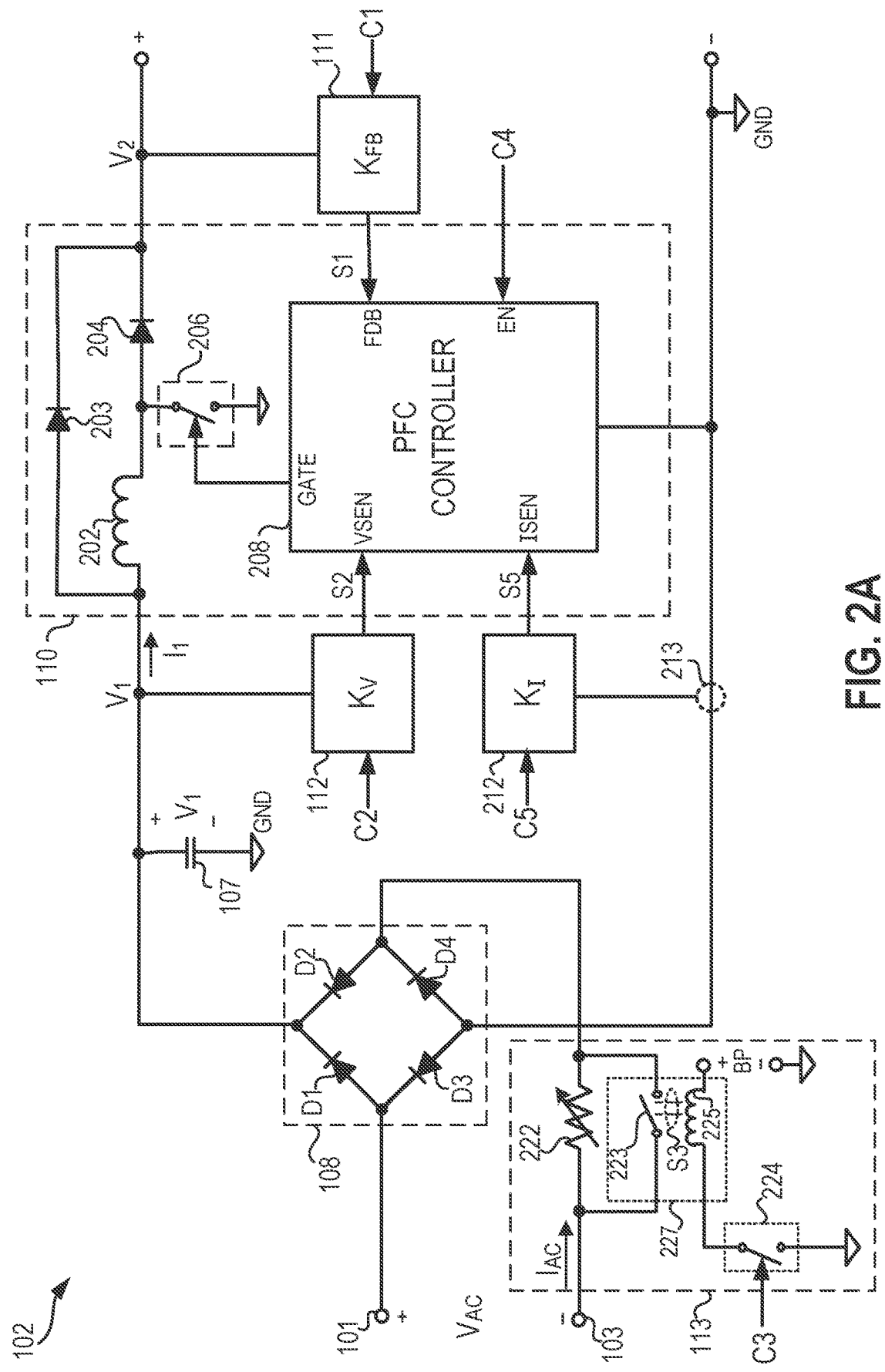
FIG. 2A illustrates a first power converter stage with controllable networks according to an embodiment.

FIG. 2A illustrates a first power converter stage 102 with controllable networks 111, 112, 113, and 212 according to an embodiment. The first power converter stage 102 includes a first stage power circuit 110 including a boost PFC controller 208, a boost switch 206, an inductor 202, a bypass diode 203, and a boost diode 204. The inductor 202, boost switch 206, and boost diode 204 are electrically connected between the input and the output of the first stage power circuit 110. The PFC controller 208 can provide a gate signal from a GATE output to control the boost switch 206 so that the intermediate voltage $V_2$ is greater than the rectified ac input voltage $V_1$ with power factor correction (PFC). The bypass diode 203 is electrically connected between the input and output of the first stage power circuit 110 and can be used as a boost inrush bypass diode during startup.

Also as shown in FIG. 2A, the controllable network 111 can be used to control and/or vary the intermediate power (i.e., intermediate voltage $V_2$ and/or intermediate current $I_2$) delivered by the first power converter stage 102. The controllable network 111 is electrically connected to receive and/or sample the intermediate voltage $V_2$ at the output of the first stage power circuit 110 where it can provide a network signal S1 to the PFC controller 208 at a feedback FDB input. In this way the controllable network 111 can function as part of a voltage feedback loop which regulates the intermediate voltage $V_2$. The network signal S1 can be a feedback signal (e.g., a feedback voltage) related to the intermediate voltage $V_2$ by a feedback ratio $K_{FB}$ (i.e., a feedback scaling/scale factor); and the control signal C1 can be used to control and/or vary the feedback ratio $K_{FB}$ and, thus, vary the intermediate voltage $V_2$. Additionally, in some embodiments the network signal S1 may be a voltage applied to an input of an error amplifier within a voltage feedback loop.

Similarly, the controllable network 112 and the controllable network 212 can be used to control and/or vary the intermediate power. Controllable network 112 is electrically connected to receive and/or sample the rectified ac input voltage $V_1$ and to provide a network signal S2 to the PFC controller 208 at a voltage sense VSEN input. The network signal S2 (e.g., an ac voltage) can be used by the PFC controller 208 to adjust power factor of the intermediate power in proportion to a control ratio $K_V$ (i.e., an ac feedback scaling/scale factor for power-factor); the control signal C2 can be used to control and/or vary the control ratio $K_V$ thereby adjusting the intermediate power (i.e., adjusting power factor correction). Controllable network 212 is electrically coupled to sample an input current at a sense node 213 and to provide a network signal S5 to the PFC controller 208 at a current sense ISEN input. The network signal S5 may also be used by the PFC controller 208 to adjust power factor of the intermediate power in proportion to a control ratio $K_I$; the control signal C5 may be used to control and/or vary the control ratio $K_I$ thereby also adjusting the intermediate power (i.e., adjusting power factor correction).

The controllable network 113 can also be used to control intermediate power within the first stage power converter 102 by controlling the delivery of the ac input current $I_{AC}$. The controllable network 113 includes a switch 224, a relay 227, and an inrush limiting resistor 222. A relay coil 225 is coupled to a bypass potential BP via the switch 224. In response to the control signal C3 the relay coil may be energized (de-energized) to provide a network signal S3 to close (or open) a relay switch 223. The network signal S3 can be the magnetic coupling signal which opens and/or closes the relay switch 223 in response to the control signal C3. When the relay switch 223 closes, then the inrush limiting resistor 222 can be bypassed to reduce impedance between the ac rectifier 108 and the input terminal 103. Reducing impedance can affect control of the intermediate power by reducing loss (i.e., power loss in the inrush limiting resistor 222).

In one embodiment when control signal C3 controls switch 224 to close, power may be consumed in activating network signal S3; and this, in turn, may have a measurable effect on system efficiency at light load. Conversely, during light-load (e.g., light-load conditions) the input current to the ac input current $I_{AC}$ may be small (e.g., may be substantially equal to zero). The ac input $I_{AC}$ may also flow through the inrush limiting resistor 222. Accordingly, losses associated with the inrush limiting resistor 222 may also be reduced during light-load conditions.

Additionally, a power loss associated with the activation of network signal S3 may be greater than a power loss associated with the dissipation of energy in the inrush limiting resistor 222. Therefore, de-activating network signal S3 may advantageously enhance performance during light-load conditions.

Also, as discussed above, the control signal C4 can be provided to enable and/or disable the first stage power circuit 110. As shown in FIG. 2A, the control signal C4 can be provided to an enable EN input of the PFC controller 208. The PFC controller 208 may include an internal network (not shown) which may provide an internal network signal (also not shown) causing the first stage power circuit 110 to provide substantially zero output power. For instance, the control signal C4 may be exerted to disable power flow by blocking a gate signal from the GATE output of the PFC controller 208.

Although FIG. 2A shows an embodiment where the first power converter stage 102 includes a first stage power circuit 110 using a boost PFC controller 208, other configurations and/or topologies are possible. For instance, instead of using a boost PFC controller 208, a first stage power circuit 110 can use a buck PFC controller; or in some configurations the first stage power circuit 110 may use a boost converter without PFC.

Figure 2B:
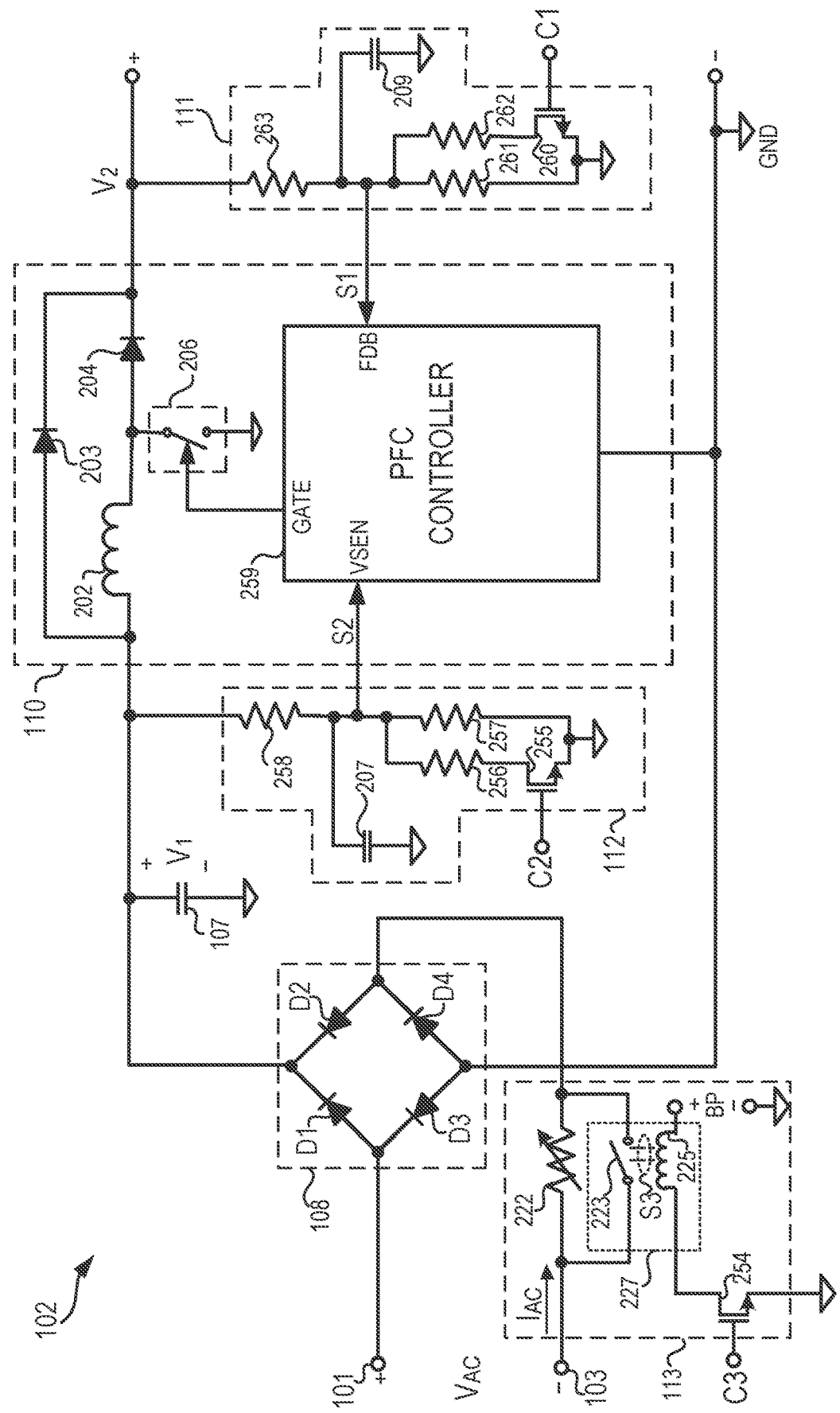
FIG. 2B illustrates a first power converter stage with controllable networks according to another embodiment.

FIG. 2B illustrates a first power converter stage 102 with controllable networks 111-113 according to another embodiment. The embodiment of FIG. 2B is similar to that of FIG. 2A except the PFC controller 259 of FIG. 2B does not include an enable EN input and a current sense ISEN input. Accordingly, the first stage power converter 102 of FIG. 2B also does not include a controllable network 212 and does not receive control signals C4-C5.

FIG. 2B also shows circuit components of controllable network 111 and controllable network 112. Controllable network 111 includes resistors 261-263, an N-channel FET 260, and a filter capacitor 209. The N-channel FET 260 receives the control signal C1 at its gate and can operate as a switch to control a value of the network signal S1 in response to the control signal C1. Also, the resistors 263 and 261 are electrically connected between the output of the first stage power circuit 110 and dc ground GND to create a resistor divider and to provide the network signal S1 in proportion to the intermediate voltage $V_2$. The capacitor 209 can be used to filter noise within the network signal S1.

Also, as shown in FIG. 2B, the N-channel FET 260 and the resistor 262 are electrically connected across resistor 261, so that when the N-channel FET 260 is closed (i.e., when the N-channel FET 260 has a high gate signal) then resistors 261 and 262 are parallel connected. Alternatively, when N-channel FET 260 is open (i.e., when the N-channel FET 260 has a low gate signal) then the resistor 262 does not parallel connect the resistor 261. In this way the control signal C1 may be used to change a resistor divider ratio (e.g., a feedback ratio $K_{FB}$ related to values of the resistors 261-263) by exerting a gate drive signal to N-channel FET 260.

Controllable network 112 includes resistors 256-258, an N-channel FET 255, and a filter capacitor 207. The N-channel FET 255 receives the control signal C2 at its gate and can operate as a switch to control a value of the network signal S2 in response to the control signal C2. Also, the resistors 258 and 257 are electrically connected between the output of the first stage power circuit 110 and dc ground GND to create a resistor divider and to provide the network signal S2 in proportion to the rectified ac input voltage $V_1$. The capacitor 207 can be used to filter noise within the network signal S2.

Also, as shown in FIG. 2B, the N-channel FET 255 and the resistor 256 are electrically connected across resistor 257, so that when the N-channel FET 255 is closed (i.e., when the N-channel FET 255 has a high gate signal) then resistors 256 and 257 are parallel connected. Alternatively, when N-channel FET 255 is open (i.e., when the N-channel FET 255 has a low gate signal) then the resistor 256 does not parallel connect the resistor 257. In this way the control signal C2 may be used to change a resistor divider ratio (e.g., a control ratio $K_V$ related to values of the resistors 256-258) by controlling the gate of N-channel FET 255.

Figure 3A:
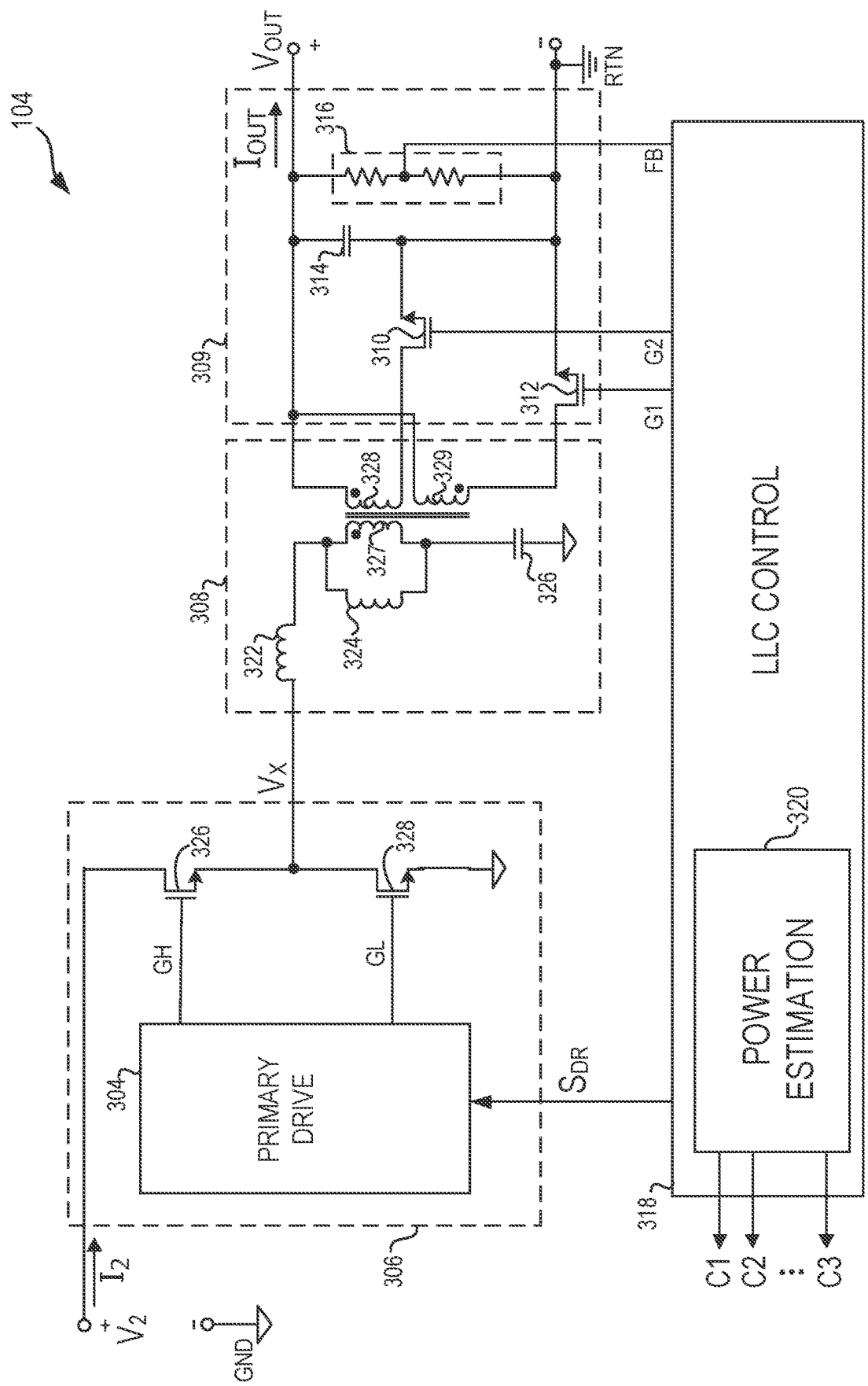
FIG. 3A illustrates a second power converter stage according to an embodiment.

FIG. 3A illustrates a second power converter stage 104 according to an embodiment. The second power converter stage 104 is a resonant converter topology which isolates dc ground GND from an isolated ground RTN. The second power converter stage 104 includes a primary circuit 306, a resonant transformer 308, a secondary circuit 309, and a controller 318.

The primary circuit 306 includes an N-channel power FET 326, an N-channel power FET 328, and a primary drive block 304. The primary drive block 304 receives a switch drive control signal $S_{DR}$ from the controller 318 and provides gate drive signals GH and GL to the N-channel power FETs 326 and 328, respectively. In response to the switch drive control signal $S_{DR}$, the primary drive block 304 switches the N-channel power FETs 326 and 328; and in this way the switched primary circuit 306 provides a switched signal $V_X$ to an input of the resonant transformer 308.

The resonant transformer 308 includes a resonant inductor 322, a magnetizing inductor 324, a resonant capacitor 326, a primary winding 327, a secondary winding 328, and a secondary winding 329. The resonant inductor 322, the magnetizing inductor 324, and the resonant capacitor 326 are connected in series forming a series inductor-inductor capacitor (LLC) network. Thus, the resonant converter topology may be referred to as an LLC converter. Power is transferred from the primary winding 327 to the secondary windings 328 and 329 where the secondary circuit 309 may be used to provide output power (i.e., output voltage $V_{OUT}$ and output current $I_{OUT}$).

The secondary circuit 309 includes an output capacitor 314, N-channel FET 310, N-channel FET 312, and a resistor divider 316. The resistor divider 316 can provide a feedback signal FB in proportion to the output power (e.g., output voltage $V_{OUT}$). The N-channel FETs 310 and 312 receive gate signals G1 and G2, respectively, and may operate as synchronous rectifiers for improved power transfer. The output capacitor 314 may provide filtering to reduce ripple and/or to improve stability.

As shown in FIG. 3A, the controller 318 can be an LLC controller configured to provide the gate signals G1, G2 and to provide the switch drive control signal $S_{DR}$ based, at least in part, upon the feedback signal FB. Also, as illustrated, the controller 318 can include a power estimation circuit 320. The power estimation circuit 320 can be used to estimate the output power (i.e., output voltage $V_{OUT}$ and output current $I_{OUT}$) and to provide control signals C1-C3 in response to a load condition. For instance, the power estimation circuit 320 may estimate that the output current $I_{OUT}$ is less than a threshold value of current. Alternatively, the power estimation circuit 320 may estimate that the output power is less than a threshold value of power. In response to determining that the output power and/or the output current $I_{OUT}$ is less than a threshold value, the power estimation circuit 320 may change a logic level of one or more of the control signals C1-C3. In some embodiments the power estimation circuit 320 may provide one or more of the control signals C1-C3 as analog control signals which may vary in relation to the output power.

Also, although FIG. 3A shows an embodiment where the second power converter stage 104 uses an LLC power converter topology, other configurations and/or topologies are possible. For instance, the second power converter stage 104 can use topologies including boost, buck, buck-boost, flyback, and the like. Additionally, although FIG. 3A shows the power estimation circuit 320 as providing three control signals C1-C3, other configurations providing greater or fewer than three control signals C1-C3 are also possible. As one of ordinary skill in the art may appreciate, the power estimation circuit 320 may use one or more signals (e.g., a winding sense signal from resonant transformer 308); and although input signals (e.g., winding sense signals from resonant transformer 308) are not illustrated, it may be appreciated that the power estimation circuit 320 may estimate power using one or more signals as described in Applicants' U.S. patent application Ser. No. 16/219,529, which is incorporated herein by reference in its entirety for all purposes.

Figure 3B:
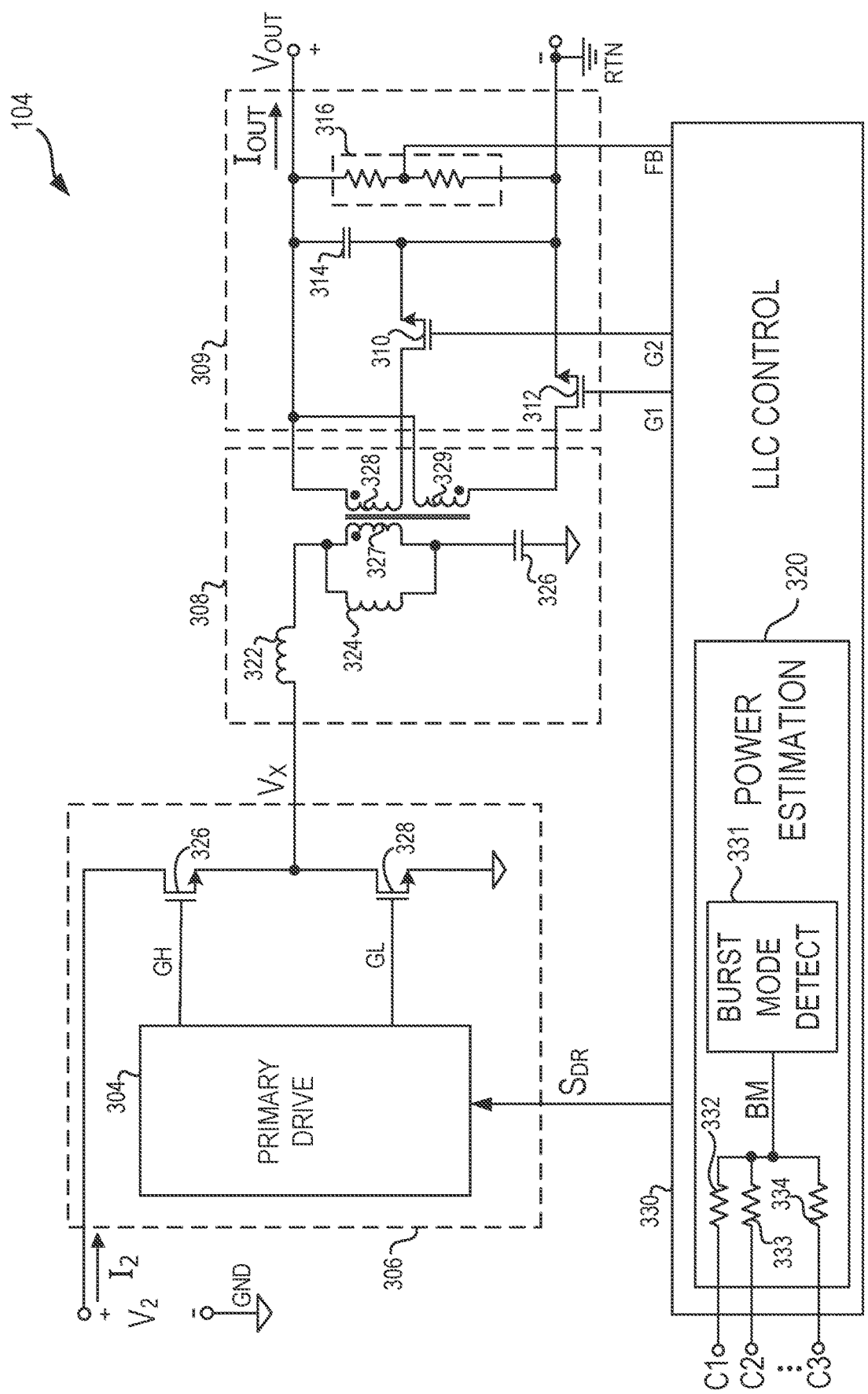
FIG. 3B illustrates a second power converter stage according to another embodiment.

FIG. 3B illustrates a second power converter stage 104 according to another embodiment. The second power converter stage 104 uses a controller 330, similar to controller 318, except the power estimation circuit 320 includes a burst mode detect circuit 331. The burst mode detect circuit 331 can be used to provide a burst mode signal BM. The burst mode signal BM can be a logic signal which changes state (i.e., high or low logic level) in response to detecting a burst mode (e.g., light load) condition. For instance, when the output power and or output current $I_{OUT}$ is reduced below a threshold level, then the burst mode detect circuit 331 may provide a logic high (or low) burst mode signal BM. Alternatively, when the output power and/or output current $I_{OUT}$ is above a threshold level, the burst mode detect circuit 331 may provide a logic low (or high) burst mode signal BM.

Also, as shown in FIG. 3B, the power estimation circuit 320 includes resistors 332-334. The resistors 332-334 are connected to an output of the burst mode detect circuit 331 to each receive the burst mode signal BM. The control signals C1-C3 may be derived in parallel from the resistors 332-334, and the resistors 332-334 may have a resistance to provide signal isolation (i.e., impedance) between signal paths associated with signals C1-C3.

Figure 3C:
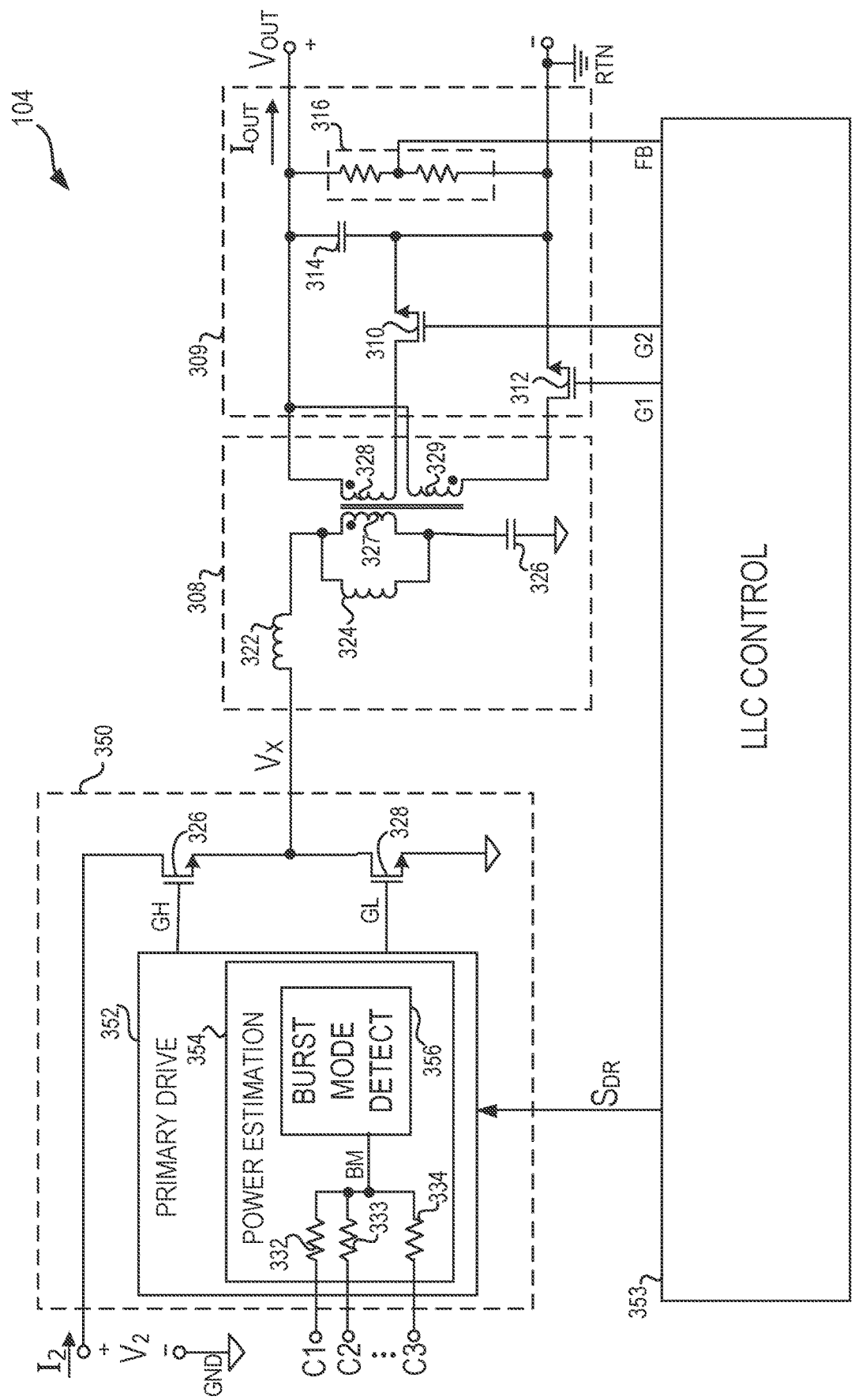
FIG. 3C illustrates a second power converter stage according to another embodiment.

FIG. 3C illustrates a second power converter stage 104 according to another embodiment. The second power converter stage 104 is similar to that of FIG. 3B, except it uses a controller 353 and a primary circuit 350. The controller 353 and the primary circuit 350 are similar to the controller 330 and the primary circuit 306, except for how the burst mode signal BM is generated. Instead of being generated within the controller 353, the burst mode signal BM is provided from the primary circuit 350.

The primary circuit 350 includes a primary drive block 352, similar to primary drive block 304, with a power estimation circuit 354, similar to power estimation circuit 320. The power estimation circuit 354 also includes a burst mode detect circuit 356 similar to burst mode detect circuit 331 for providing the burst mode signal BM to resistors 332-334.

Figure 3D:
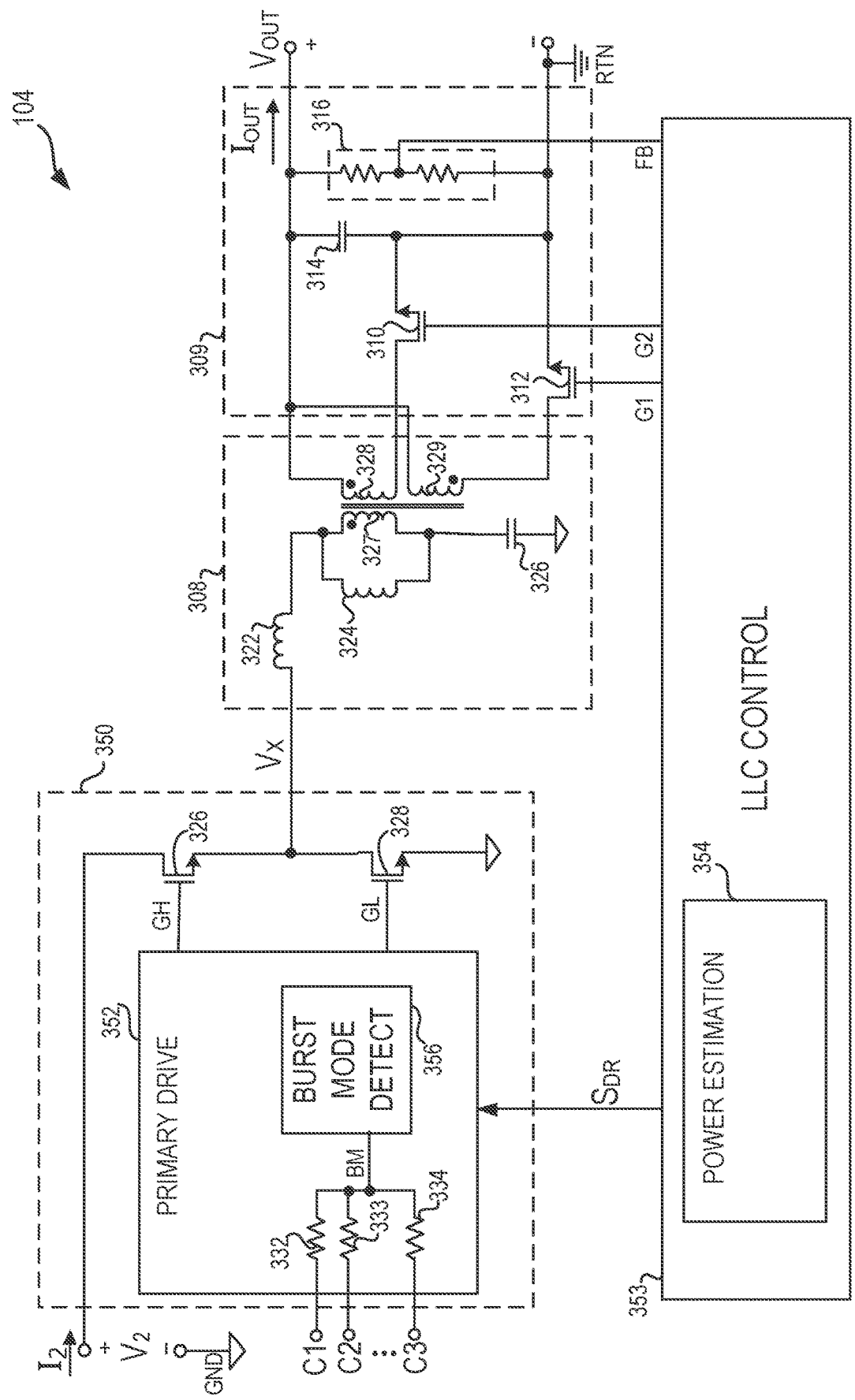
FIG. 3D illustrates a second power converter stage according to another embodiment.

Although the embodiment of FIG. 3C illustrates the primary drive block 352 as including the power estimation circuit 354; other configurations are possible. For instance, FIG. 3D illustrates a second power converter stage 104 according to another embodiment wherein the primary drive block 352 includes the burst mode detect circuit 356 for providing burst mode signal BM to resistors 332-334. However, as illustrated in FIG. 3D, the controller 353 may comprise primary estimation circuit 354. As discussed above and herein, aspects of the primary estimation circuit 354 may also be found in the material presented in Applicants' U.S. patent application Ser. No. 16/219,529.

Figure 4A:
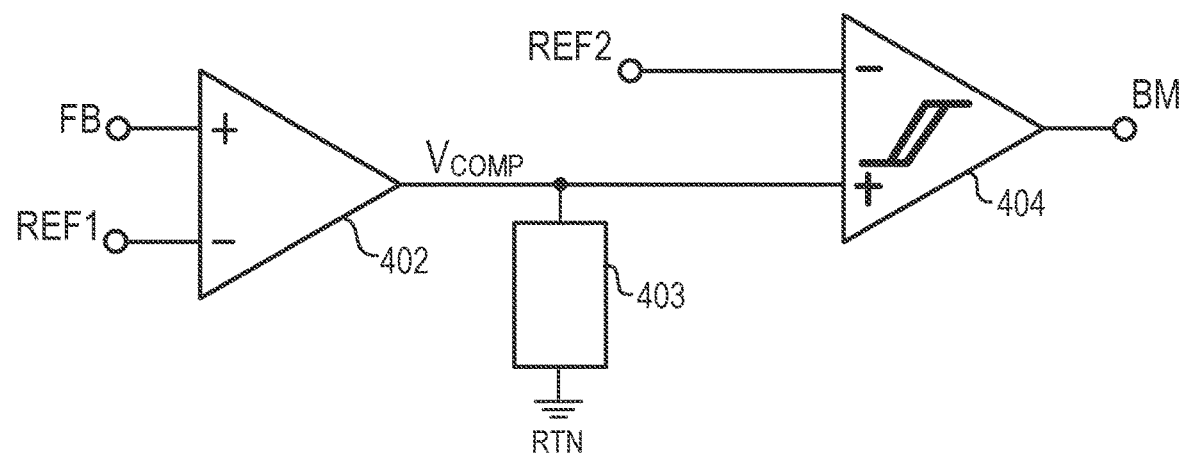
FIG. 4A illustrates a circuit realization of a burst mode detect circuit to detect burst mode according to a first embodiment.

FIG. 4A illustrates a circuit realization of a burst mode detect circuit 331 to detect burst mode according to a first embodiment. The burst mode detect circuit 331 includes an error amplifier 402, a compensation network 403, and a comparator 404, and can be a circuit realization of the burst mode detect circuit 331 as described above regarding the power estimation circuit 320. The error amplifier 402 receives the feedback signal FB at a non-inverting input and compares it with a reference REF1 at an inverting input. The reference REF1 and the feedback signal FB can be voltages, and to the first order, the error amplifier 402 may function to reduce the error voltage (i.e., the difference voltage) between the reference REF1 and the feedback signal FB.

Also the compensation network 403 can be used to stabilize and/or compensate the error amplifier output voltage $V_{COMP}$. The error amplifier output voltage $V_{COMP}$ may vary monotonically with variations in the feedback signal FB and can be compared with a second reference REF2 using the comparator 404.

The comparator 404 receives the error amplifier output voltage $V_{COMP}$ at a non-inverting input and compares it to the second reference REF2 at an inverting input; in response the comparator 404 provides the burst mode signal BM. The second reference REF2 can be chosen such that the burst mode signal BM will change states (e.g., change from logic low to logic high) to indicate a burst mode condition. The burst mode condition can be based on a load condition and/or output power. For instance, the burst mode condition can be set to a fixed output power level indicating a light load (e.g., ten percent of maximum rated output power).

As the output power decreases causing the output voltage $V_{OUT}$ and the feedback signal FB to increase, the error amplifier output voltage $V_{COMP}$ may increase accordingly. Eventually, the output power may decrease so that the error amplifier output voltage $V_{COMP}$ increases above the second reference REF2 to drive the burst mode signal BM high.

Figure 4B:
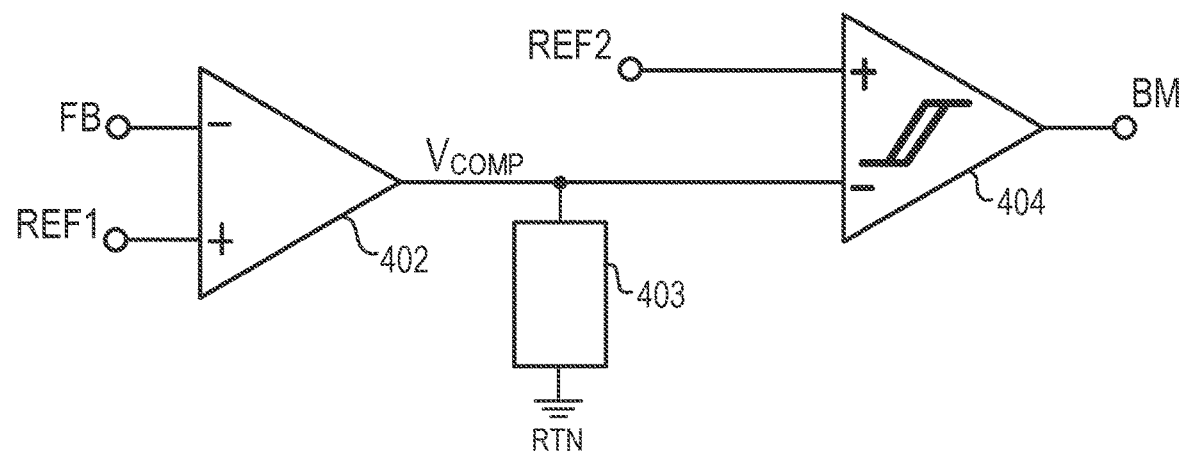
FIG. 4B illustrates a circuit realization of a burst mode detect circuit to detect burst mode according to a second embodiment.

FIG. 4B illustrates a circuit realization of a burst mode detect circuit 431 to detect burst mode according to a second embodiment. The burst mode detect circuit 431 is similar to burst mode detect circuit 331, except signals are configured so that the burst mode signal BM indicates a burst mode (i.e., light load) condition when the error amplifier output voltage $V_{COMP}$ reduces below the second reference REF2. In this regard the error amplifier 402 receives the feedback signal FB at its inverting input to compare with the reference REF1 at its non-inverting input; and the comparator 404 receives the error amplifier output voltage $V_{COMP}$ at its inverting input and compares it to the second reference REF2 at its non-inverting input.

Although burst mode detect circuits 331 and 431 show circuit realization embodiments using only an error amplifier 402, a compensation network 403, and a comparator 404, other analog and/or digital realizations are possible. For instance, as one of ordinary skill in the art can appreciate, a circuit realization may include additional analog and/or digital components with analog, mixed, and/or digital signals (e.g., voltage signals and/or current signals).

Figure 5A:
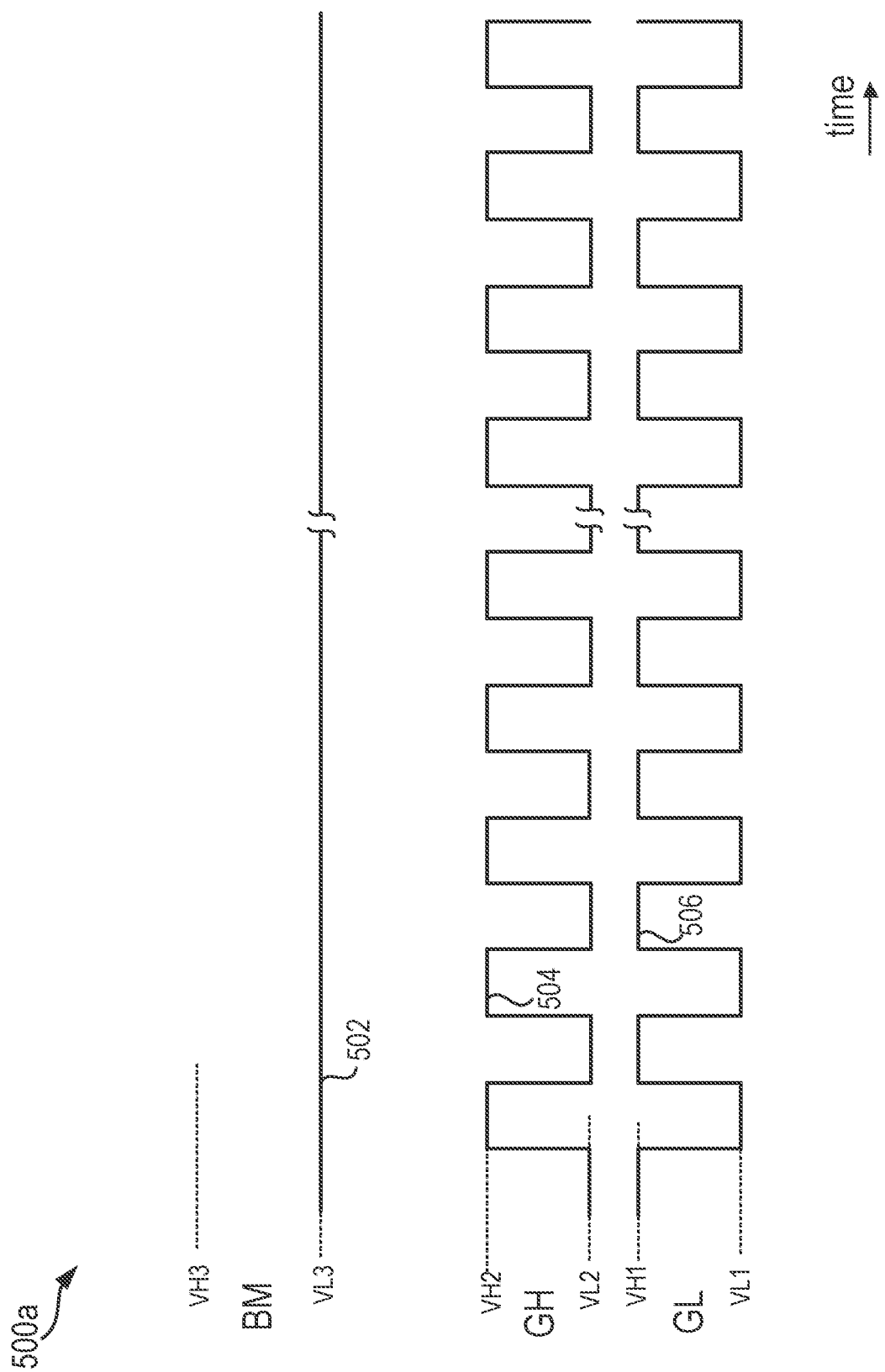
FIG. 5A illustrates switching waveforms during a continuous conduction mode according to an embodiment.
Figure 5B:
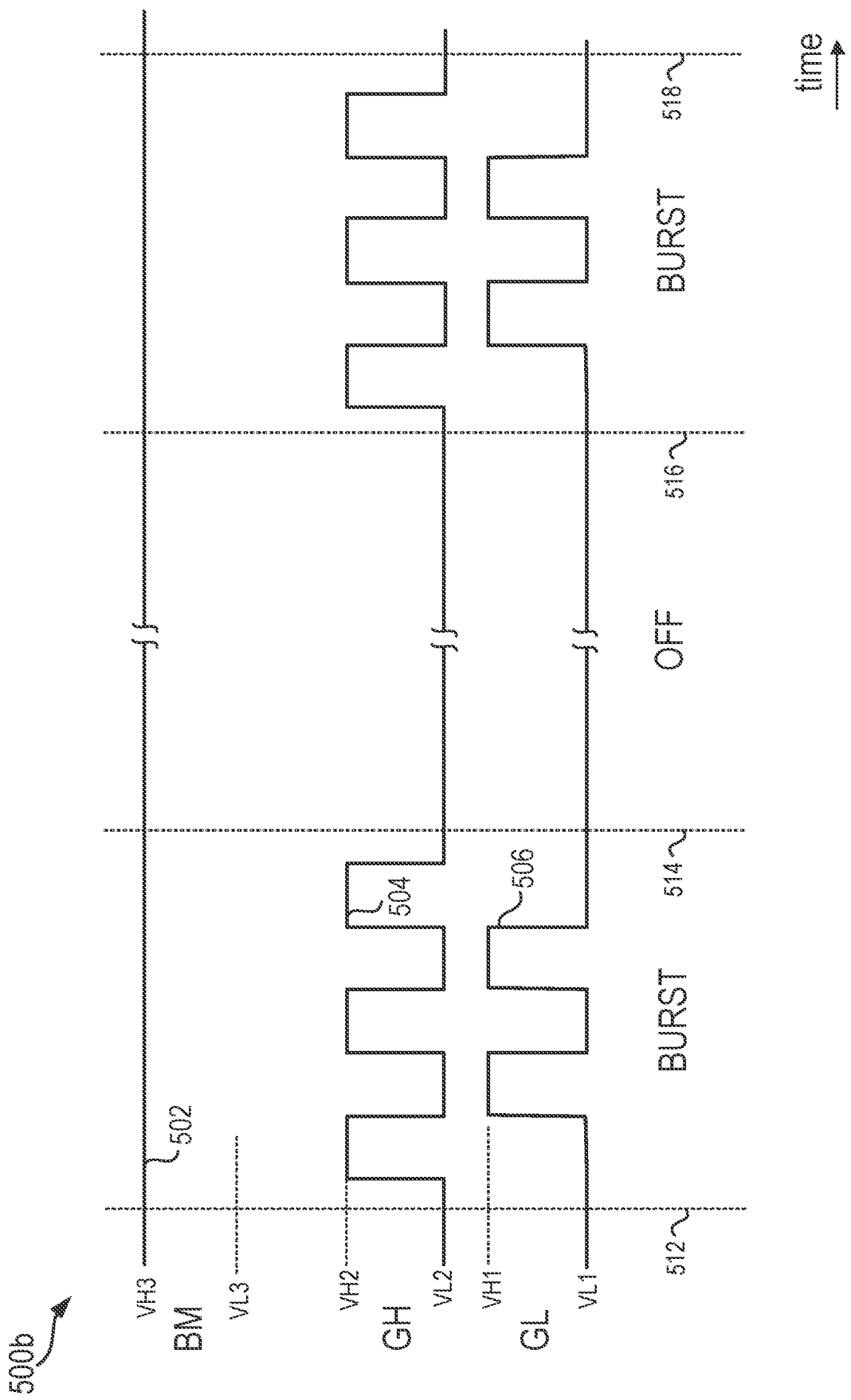
FIG. 5B illustrates switching waveforms during burst mode according to an embodiment.

FIG. 5A illustrates switching waveforms 500a during a continuous conduction mode according to an embodiment; and FIG. 5B illustrates switching waveforms 500b during burst mode according to an embodiment. The switching waveforms 500a and 500b show waveforms 502, 504, and 506 respectively corresponding to the burst mode signal BM, the gate drive signal GH, and the gate drive signal GL versus time. The gate drive signals GH and GL, as described above regarding FIGS. 3A-3C, may respectively be applied to the N-channel power FETs 326 and 328 to drive the N-channel power FETs 326 and 328 in a half bridge configuration.

As illustrated, during continuous conduction mode, the burst mode signal BM can be a logic low value VL3 (e.g., substantially equal to 0); and the gate drive signals GH and GL switch continuously to drive the N-channel power FETs 326 and 328 in a half bridge configuration. For instance, the gate drive signal GH switches (i.e., transitions) from its low value VL2 to its high value VH2 while the gate drive signal GL switches from its high value VH1 to its low value VL1. When the gate drive signal GH (GL) attains its low value VL2 (VL1) then the corresponding N-channel power FET 326 (328) turns off; similarly, when the gate drive signal GH (GL) attains its high value VH2 (VH1) then the corresponding N-channel power FET 326 (328) turns on.

As shown in FIG. 5B, during burst mode, the burst mode signal BM can be a logic high value VH3 (e.g., substantially equal to a digital logic high voltage). Also, as shown in FIG. 5B during burst mode, switching may periodically be inhibited. For instance, between times 512 and 514 and between times 516 and 518, the gate drive signals GH and GL are switching. However, between times 514 and 516, switching is inhibited (i.e., off). The periodic inhibiting of switching can be a characteristic behavior of waveforms 504 and 506 during burst mode.

Although FIG. 5A and FIG. 5B show an embodiment where the burst mode signal BM can be a logic low value VL3 during continuous conduction mode and a logic high value VH3 during burst mode; other embodiments are possible. As one of ordinary skill in the art may appreciate, inverted logic may be used to accomplish identical and/or similar logic functions. For instance, FIG. 5C and FIG. 5D show an embodiment where the burst mode signal BM can be a logic high value VH3 during continuous conduction mode and a logic low value VL3 during burst mode.

Figure 5C:
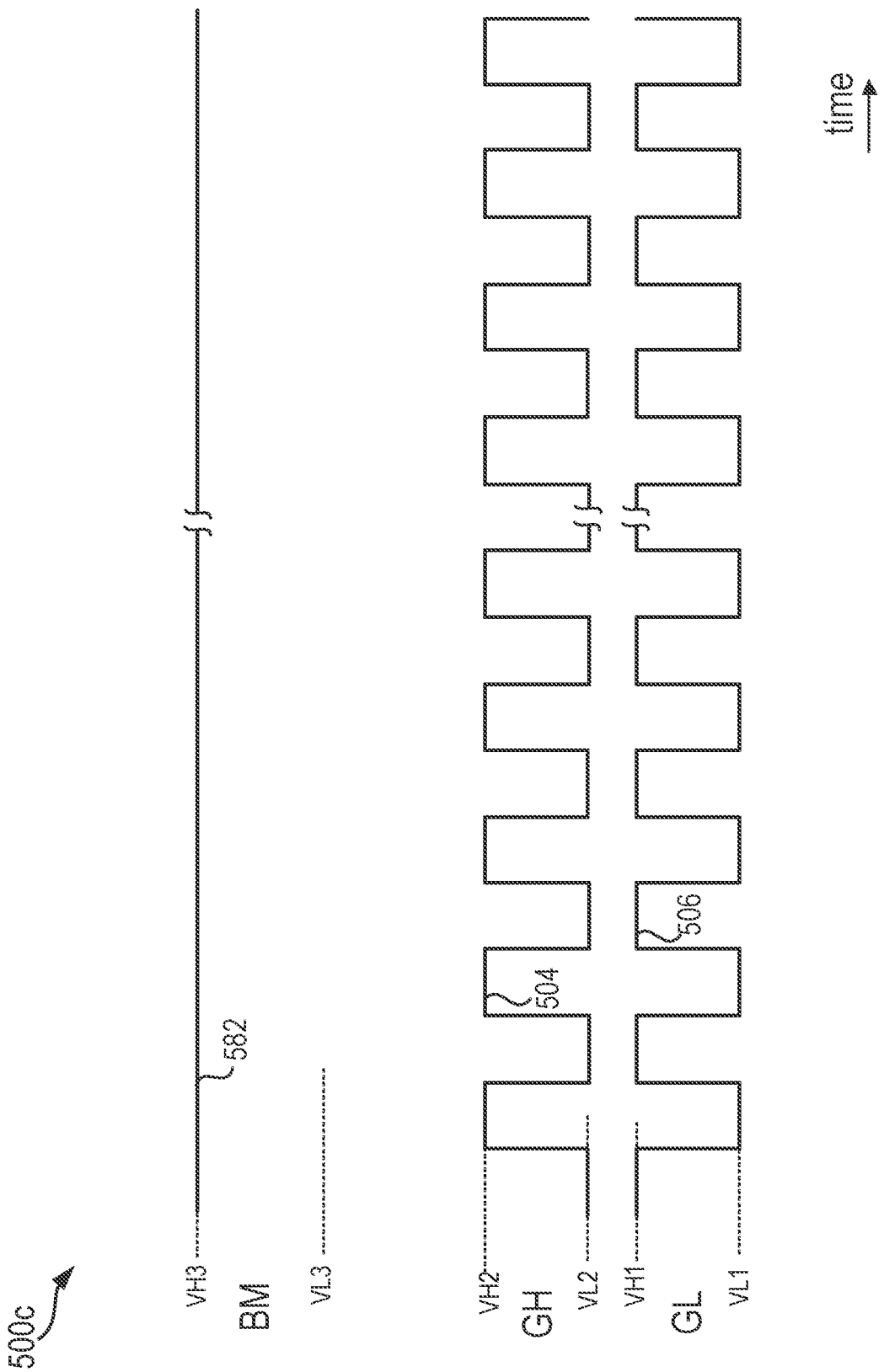
FIG. 5C illustrates switching waveforms during a continuous conduction mode according to another embodiment.
Figure 5D:
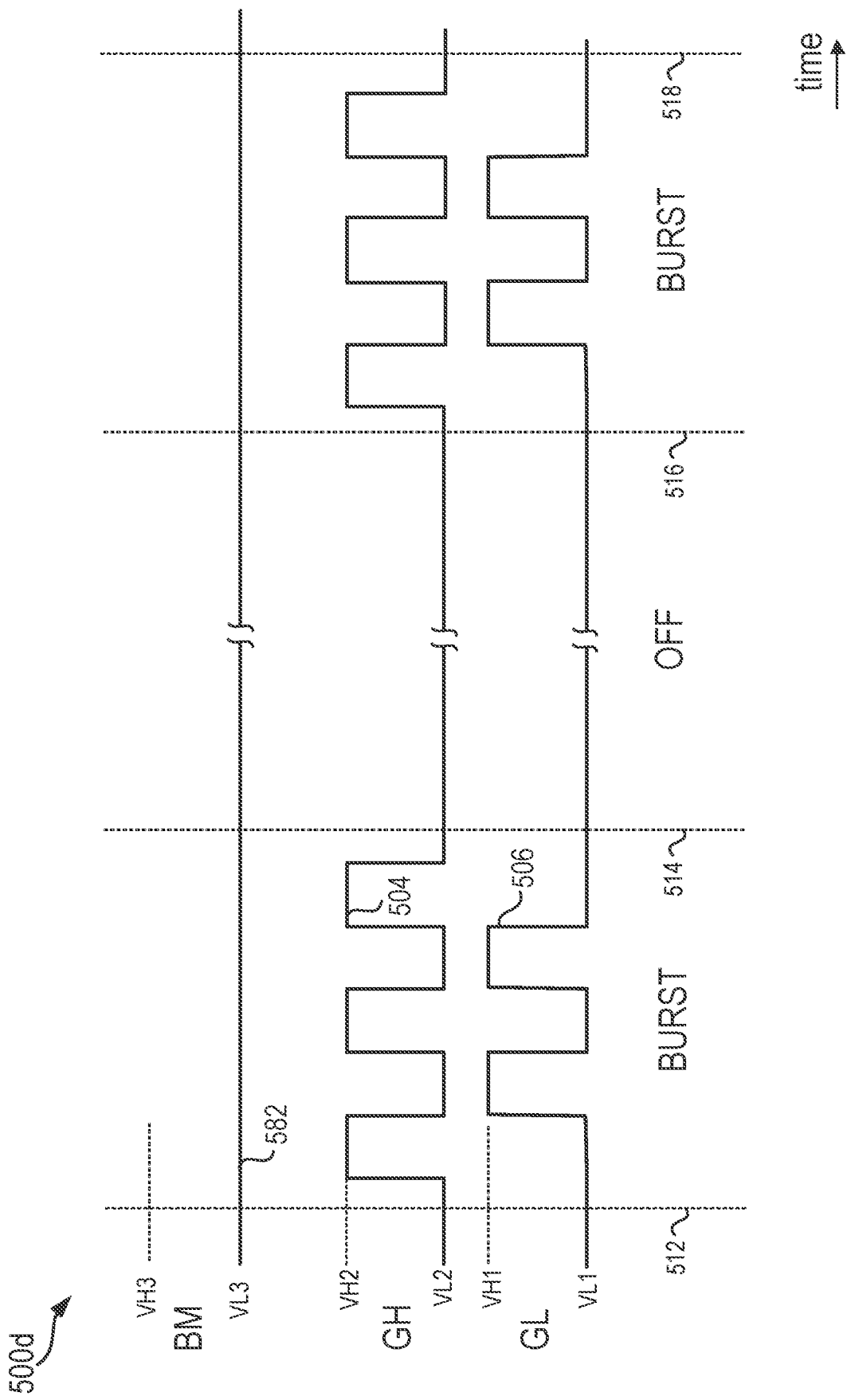
FIG. 5D illustrates switching waveforms during burst mode according to another embodiment.

FIG. 5C illustrates switching waveforms 500c during a continuous conduction mode according to another embodiment; and FIG. 5D illustrates switching waveforms 500d during burst mode according to another embodiment. Switching waveforms 500c and 500d are similar to switching waveforms 500a and 500b, respectively, except the burst mode signal BM follows a waveform 582 which may be inverted with respect to waveform 502. For instance, when waveform 582 is a logic high value VHS, then waveform 502 can be logic low value VL3, inverted with respect to waveform 582.

Figure 6A:
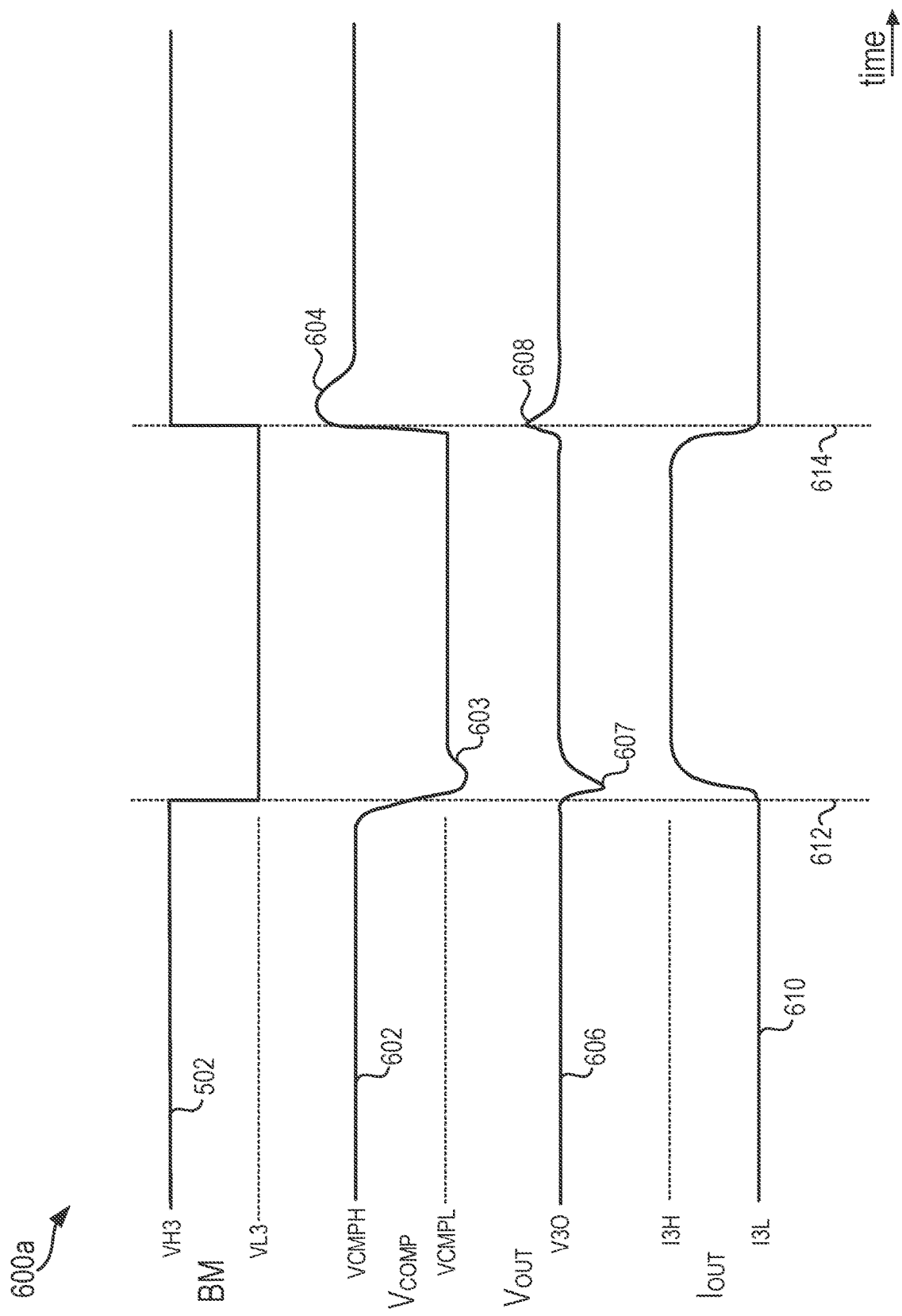
FIG. 6A illustrates signal waveforms during a load step according to an embodiment.

FIG. 6A illustrates signal waveforms 600a during a load step according to an embodiment. The signal waveforms 600a respectively show waveforms 502, 602, 606, and 610 corresponding to the burst mode signal BM, the error amplifier output voltage $V_{COMP}$, the output voltage $V_{OUT}$, and the output current $I_{OUT}$ versus time. Additionally, the burst mode signal BM, the error amplifier output voltage $V_{COMP}$, the output voltage $V_{OUT}$, and the output current $I_{OUT}$ can correspond to the burst mode signal BM, error amplifier output voltage $V_{COMP}$, the output voltage $V_{OUT}$, and the output current $I_{OUT}$ as discussed above with regards to FIGS. 3B and 4A.

As illustrated by the output current $I_{OUT}$ waveform 610, there are load steps at or substantially at times 612 and 614. The load steps occurring at times 612 and 614 give rise to waveform 610 showing transitions between burst mode (i.e., current level I3L) to one-hundred percent full load (i.e., current level I3H). During the times less than time 612 and greater than time 614, the output current $I_{OUT}$ is low (i.e., substantially equal to a light current I3L); and between times 612 and 614, the output current $I_{OUT}$ may be at a maximum heavy load (i.e., substantially equal to a maximum one-hundred percent load current I3H).

Also, as illustrated in FIG. 6A, the waveforms 600a change state and vary at times 612 and 614 consistent with the burst mode detect circuit 331 of FIGS. 3B and 4A. For instance, at time 612 during a step from burst mode to maximum heavy load, the burst mode signal BM changes from high to low (i.e., from VH3 to VL3); and at time 614 during a step from maximum heavy load to burst mode, the burst mode signal BM changes from low to high (i.e., from VL3 to VH3).

At time 612 the error amplifier output voltage $V_{COMP}$ transitions from a high to low (i.e., from VCMPH to VCMPL); and at time 614 the error amplifier output voltage $V_{COMP}$ transitions from a low to high (i.e., from VCMPL to VCMPH). Additionally, due to system response and/or compensation, the waveform 602 of the error amplifier output voltage $V_{COMP}$ shows some undershoot 603 and overshoot 604 following times 612 and 614, respectively. Also, the output voltage $V_{OUT}$ is approximately and/or substantially equal to its regulated value V3O; and at times 612 and 614, the waveform 606 of the output voltage $V_{OUT}$ shows undershoot 607 and overshoot 608.

As discussed above, the burst mode signal BM can correspond to the burst mode signal BM as described in previous FIGS. 3B and 4A and can be indicative of the output power. According to the teachings herein, the control signals C1-C3, CN of FIG. 1 may in some embodiments be derived by the burst mode signal and may be used to enhance efficiency of the multi-stage power conversion system 100 while allowing the multi-stage converter 100 to dynamically undergo the full load step as illustrated at time 612 (i.e., a full load step from burst mode to maximum load).

Figure 6B:
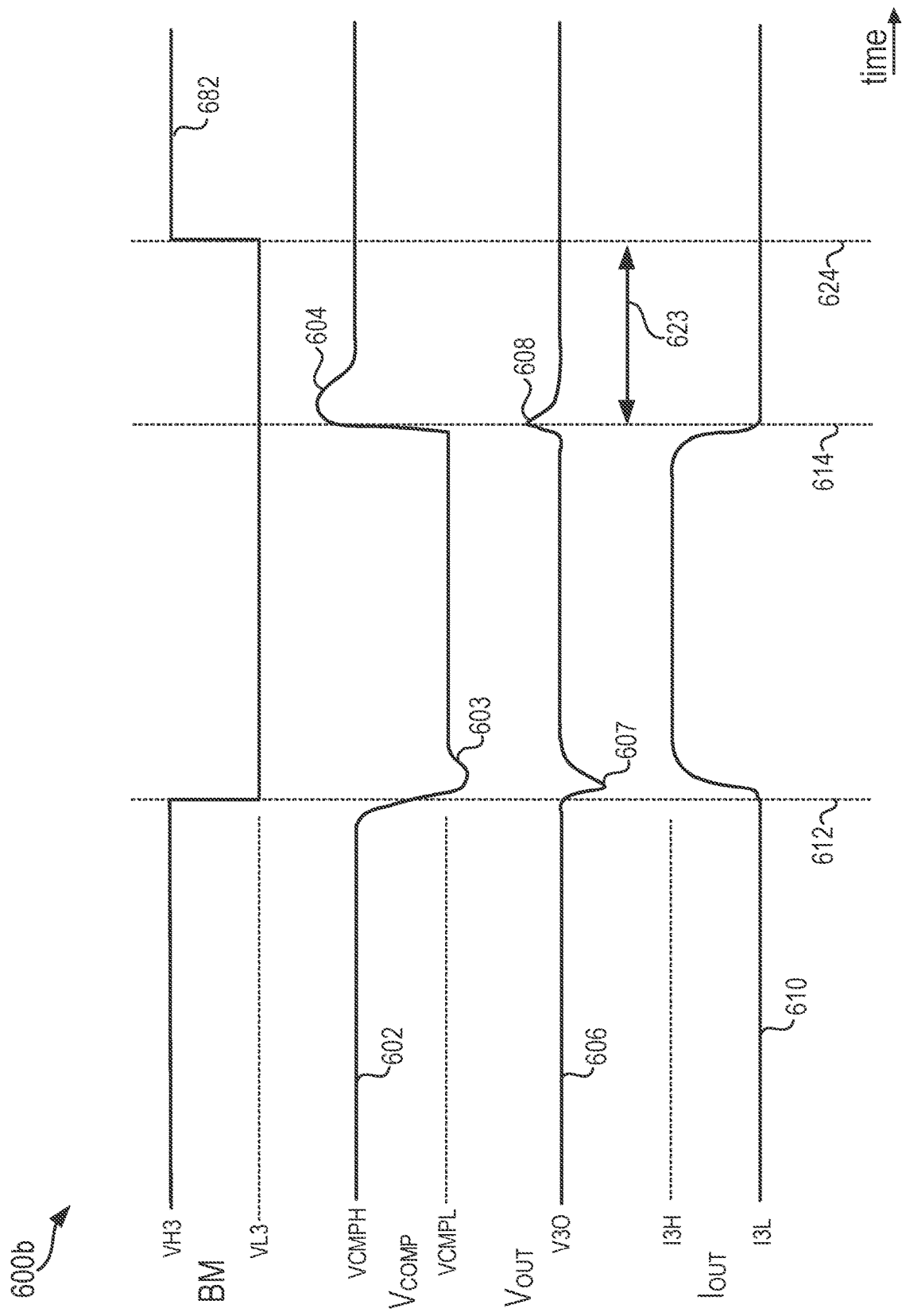
FIG. 6B illustrates signal waveforms during a load step according to another embodiment.

As one of ordinary skill in the art may appreciate, signals may have a response time, which in turn may be reflected in the behavior of waveforms 502, 602, 606, and 610. For instance, FIG. 6B illustrates signal waveforms 600b according to another embodiment similar to that of FIG. 6A. The signal waveforms 600b show waveforms 682, 602, 606, and 610 corresponding to the burst mode signal BM, the error amplifier output voltage $V_{COMP}$, the output voltage $V_{OUT}$, and the output current $I_{OUT}$ versus time, respectively; however, unlike the embodiment of FIG. 6A, waveform 682 exhibits delay 623.

As illustrated, the burst mode signal BM transitions from low to high (i.e., from VL3 to VH3) at time 624, delayed with respect to time 614. This may be due, in part, to an asymmetry in the system response time as a function of load and/or mode (e.g., as a function of operation in continuous conduction mode and/or operation in burst mode.) For instance, at time 612 when undergoing a full load step, the system (e.g., the multi-stage power conversion system 100) may be configured to respond at a higher response rate (i.e., with a lower response time) than at time 614.

Figure 7:
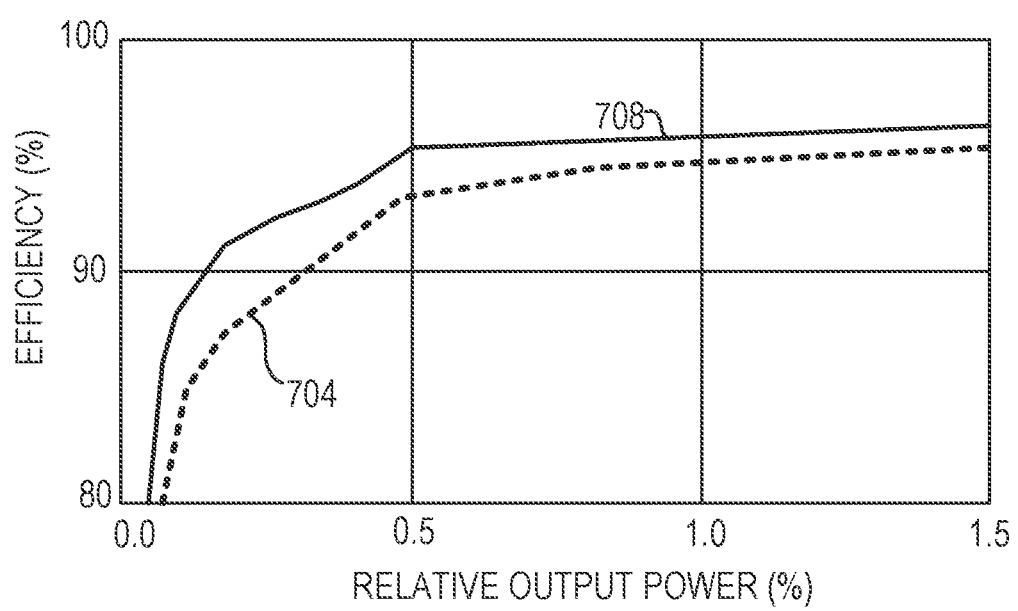
FIG. 7 compares curves of efficiency versus relative output power according to a multi-stage power conversion system embodiment.

FIG. 7 compares curves 704, 708 of efficiency versus relative output power according to a multi-stage power conversion system embodiment. Curve 708 can correspond to efficiency versus relative output power for a multi-stage power conversion system using the first stage power converter 102 of FIG. 2B. The first stage power converter 102 can be configured to boost from a rectified ac input voltage $V_1$ (e.g., 230 volts) to an intermediate voltage $V_2$ (e.g., 380 volts) under nominal load conditions. The control signals C1-C3 can be used so that when second power converter stage 104 transitions to burst mode, then the controllable networks 111-113 cause the intermediate power to reduce (e.g., cause the intermediate voltage $V_2$ to reduce from 380 volts to 330 volts) while still allowing the output power (i.e., the output voltage $V_{OUT}$ and the output current $I_{OUT}$) to remain regulated by the second power converter stage 104. Curve 704 can correspond to a multi-stage power conversion system without the control signals C1-C3 and can be used for comparison. The multi-stage power conversion system corresponding to curve 704 maintains the intermediate voltage during burst mode (i.e., maintains V2 equal to 380 volts).

According to the teachings herein, a multi-stage power converter system 100 corresponding to curve 708 can undergo a full load step as illustrated in FIG. 6A just like a multi-stage power converter system corresponding to curve 704; and as shown in FIG. 7, the multi-stage power converter system 100 corresponding to curve 708 advantageously attains higher efficiency during burst mode (i.e., during light load conditions) and while the relative output power is less than 1.5 percent.

Figure 8:
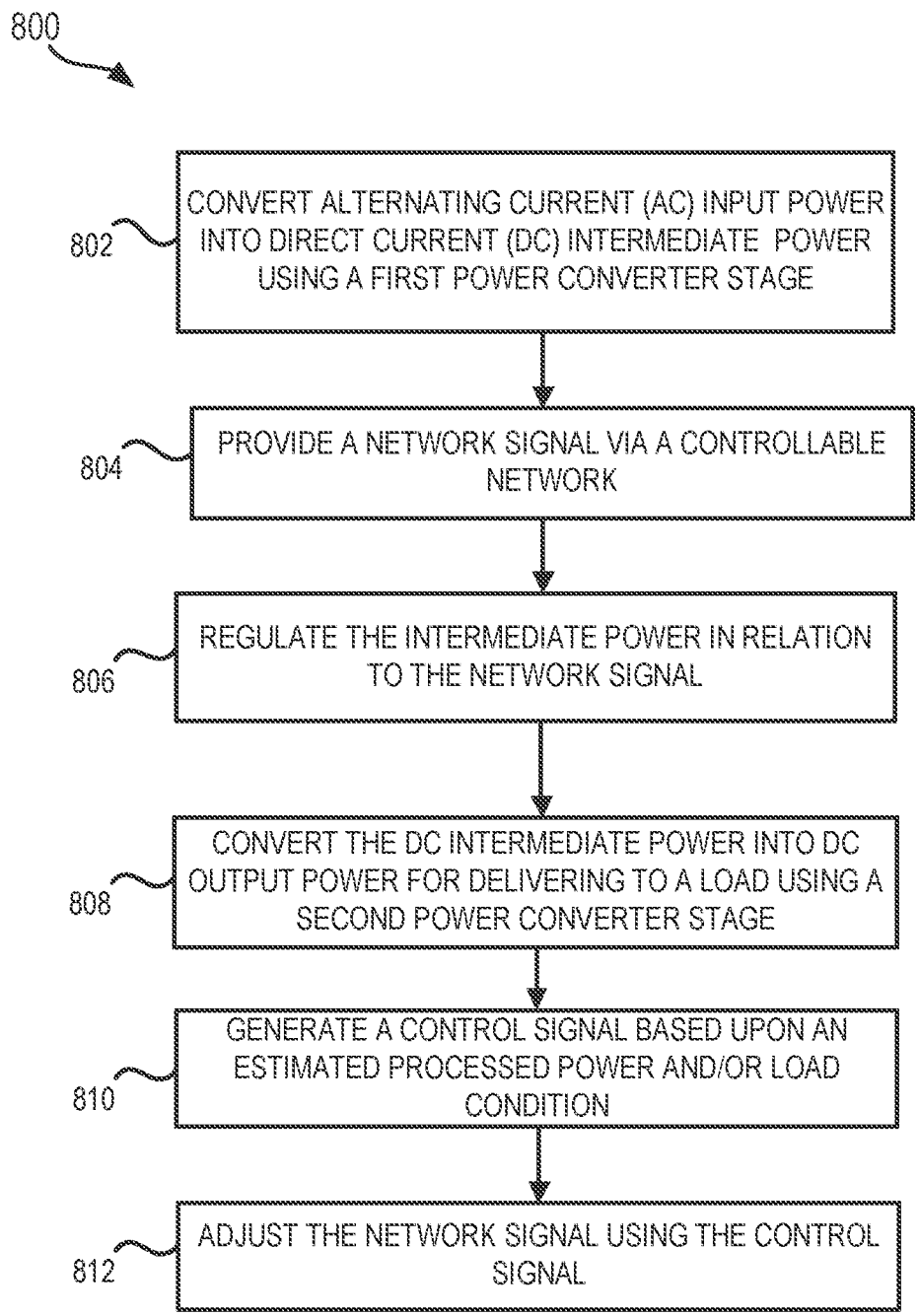
FIG. 8 illustrates a conceptual flow diagram for using controllable networks to control an intermediate power delivered to a power converter stage according to an embodiment.

FIG. 8 illustrates a conceptual flow diagram 800 for using controllable networks to control an intermediate power delivered to a power converter stage according to an embodiment. The order in which some or all of steps in flow diagram 800 should not be deemed limiting. Rather, one of ordinary skill in the art having the benefit of the present disclosure will understand that some of the process blocks may be executed in a variety of orders not illustrated, or even in parallel.

Step 802 can correspond to using a first power converter stage 102 to convert ac input power into dc intermediate power. The dc intermediate power can correspond to intermediate power (i.e., intermediate voltage $V_2$ and intermediate current $I_2$) as described above.

Step 804 can correspond to providing the network signal (e.g., a network signal including at least one of the network signals S1-S3). Step 806 can correspond to regulating the intermediate power in relation to a network signal. For instance, as described above in regards to the embodiment of FIG. 2B, the intermediate power and or voltage $V_2$ can be regulated and/or varied by the network signals S1-S3. Step 808 can correspond to using a second power converter stage 104 for converting the dc intermediate power (i.e., intermediate voltage $V_2$ and intermediate current $I_2$) into dc output power (i.e., output voltage $V_{OUT}$ and output current $I_{OUT}$) for delivering to a load.

Step 810 can correspond to using the power estimation circuit 320 and/or power estimation circuit 354 to estimate the output power. For instance, the burst mode detect circuit 331 and/or burst mode detect circuit 356 may detect burst mode and may provide the burst mode signal BM. The burst mode signal BM may be used to generate one or more of the network signals S1-S3 as described above with regards to FIGS. 3B and 3C. Then step 812 may correspond to the adjustment of the network signal (e.g., one or more of the network signals S1-S3) in response to a control signal (e.g., the control signals C1-C3).

Devices employing the above described multi-stage power converter systems can be implemented intro various electronic devices. Examples of the electronic devices can include, but are not limited to, consumer electronic products, parts of the consumer electronic products, electronic test equipment, and the like.

According to the concepts of multi-stage power conversion systems, a multi-stage power conversion system 100 may have a plurality of configurations whereby system parameters, signals, voltages, and operating conditions can determine, at least in part, its efficiency and performance. Also, according to the teachings herein, control signals C1-C3, and CN may be used to enhance efficiency of the multi-input power conversion system 100 by controlling the plurality of configurations. For instance, as described herein, control signals C1-C3 may be adjusted to attain higher efficiency (e.g., curve 708 of FIG. 7) while availing a full load step.

Examples of operating conditions which may be adjusted and/or controlled by using control signals C1-C3, and CN can include, but are not limited to input and output voltages. For instance, with reference to FIG. 1 efficiency of the multi-stage power conversion system 100 may depend, at least in part, upon a relationship of the ac input voltage $V_1$ and the intermediate voltage $V_2$. In some embodiments (e.g., when the first power converter stage 102 is a boost converter stage) efficiency of the first power converter stage 102 may improve as the intermediate voltage $V_2$ decreases. This may be attributed to a plurality of reasons including the following: efficiency of a first power converter stage 102 (e.g., a boost converter stage) increases as its intermediate voltage $V_2$ approaches (i.e., becomes closer in value to) its ac input voltage $V_1$; also, quiescent loss of a first power converter stage 102 may decrease with intermediate voltage $V_2$.

In other embodiments efficiency of the multi-stage power conversion system 100 may further depend upon the second power converter stage 104. For instance, the second power converter stage 104 may be configured to operate with an efficiency which is a function of output power (i.e., output voltage $V_{OUT}$ and output current $I_{OUT}$) delivered to load 106.

As presented herein, one aspect of the teachings is a multi-stage power conversion system comprising a first power converter stage and a second power converter stage. The multi-stage power conversion system is configured to convert an alternating (ac) input power and to provide a direct current (dc) output power to a load. The first power converter stage comprises a controllable network. The first power converter stage is configured to regulate the dc intermediate power in relation to a network signal. The controllable network is configured to provide the network signal based on a control signal. The second power converter stage is electrically coupled in cascade with the first power converter stage. The second power converter stage comprises a power estimation circuit. The second power converter is configured to convert the dc intermediate power into the dc output power. The power estimation circuit is configured to provide the control signal in response to a dc output power condition.

In another aspect a method of multi-stage power conversion comprises: converting an alternating current (ac) input power into a direct current (dc) intermediate power using a first power converter stage; providing a network signal via a controllable network; regulating the dc intermediate power in relation to the network signal; converting the dc intermediate power into dc output power for delivering to a load using a second power converter stage;; generating a control signal based upon a load condition; and adjusting the network signal using the control signal.

Regulating the dc intermediate power in relation to the network signal can further comprise: using the first stage to regulate the dc intermediate voltage when the load condition is a burst mode load condition; and using the first stage to regulate the dc intermediate voltage to a second voltage, greater than the first voltage, when the load condition is a continuous conduction mode load condition.

The method of multi-stage power conversion can further comprise: converting the ac input power into a rectified ac input power, the rectified ac input power comprising a rectified ac voltage and a rectified ac current. The controllable network can be a resistor network. The resistor network can comprise a scale factor (e.g., the feedback ratio $K_{FB}$).

The above description of illustrated examples of the present disclosure, including what is described in the Abstract, are not intended to be exhaustive or to be limitation to the precise forms disclosed. While specific embodiments of, and examples for controllable networks to vary inter-stage power transfer in a multi-stage power conversion system are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings herein.

Although the present invention is defined in the claims, it should be understood that the present invention can alternatively be defined in accordance with the following examples:

EXAMPLE 1

A multi-stage power conversion system configured to convert an alternating current (ac) input power and to provide a direct current (dc) output power to a load, the multi-stage power conversion system comprising: a first power converter stage comprising a controllable network, wherein the first power converter stage is configured to convert the ac input power into a dc intermediate power and to regulate the dc intermediate power in relation to a network signal, and wherein the controllable network is configured to provide the network signal based on a control signal; and a second power converter stage electrically coupled in cascade with the first power converter stage and comprising a power estimation circuit, wherein the second power converter stage is configured to convert the dc intermediate power into the dc output power, and wherein the power estimation circuit is configured to provide the control signal in response to a dc output power condition.

EXAMPLE 2

The multi-stage power conversion system of example 1, wherein the second power converter stage comprises a resonant converter.

EXAMPLE 3

The multi-stage power conversion system of any one of the previous examples, wherein the first power converter stage comprises: an alternating current (ac) rectifier configured to receive the ac input power and to convert the ac input power into a rectified ac input power, the rectified ac input power comprising a rectified ac voltage and a rectified ac current; and a first stage power circuit configured to convert the rectified ac input power into the dc intermediate power and to regulate the dc intermediate power in relation to the network signal, the dc intermediate power comprising a dc intermediate voltage.

EXAMPLE 4

The multi-stage power conversion system of any one of the previous examples, further comprising a hold-up capacitor configured to hold the dc intermediate voltage.

EXAMPLE 5

The multi-stage power conversion system of any one of the previous examples, wherein the first stage power circuit comprises a boost power factor correction controller.

EXAMPLE 6

The multi-stage power multi-stage power conversion system of any one of the previous examples, wherein the dc output power condition comprises: a light load condition whereby the second power converter stage operates in a burst mode; and a nominal load condition whereby the second power converter stage operates in a continuous conduction mode.

EXAMPLE 7

The multi-stage power conversion of any one of the previous examples, wherein the first power converter stage is configured to regulate the dc intermediate power with a high output impedance under the light load condition and the second power converter stage is configured to receive the dc intermediate power from the hold-up capacitor.

EXAMPLE 8

The multi-stage power conversion system of any one of the previous examples, wherein the first power converter stage is configured to regulate the dc intermediate voltage to a first voltage under the light load condition; and wherein the first power converter stage is configured to regulate the dc intermediate voltage to a second voltage under the nominal load condition.

EXAMPLE 9

The multi-stage power conversion system of any one of the previous examples, wherein the first voltage is less than the second voltage.

EXAMPLE 10

The multi-stage power conversion system of any one of the previous examples, wherein the controllable network comprises a switch configured to receive the control signal.

EXAMPLE 11

The multi-stage power conversion system of any one of the previous examples, further comprising an inrush protection circuit configured to reduce an inrush of the rectified ac current, wherein the switch is configured to bypass the inrush protection circuit under the light load condition.

EXAMPLE 12

The multi-stage power conversion system of any one of the previous examples, wherein the controllable network comprises a resistor network electrically coupled to the first stage power circuit and configured to provide the network signal.

EXAMPLE 13

The multi-stage power conversion system of any one of the previous examples, wherein the resistor network is configured to sample a first stage power converter signal and to provide the network signal comprising the first stage power converter signal multiplied by a scale factor.

EXAMPLE 14

The multi-stage power conversion system of any one of the previous examples, wherein the switch is configured to adjust the scale factor in response to the control signal.

EXAMPLE 15

The multi-stage power conversion system of any one of the previous examples, wherein the first stage power converter signal comprises the rectified ac voltage.

EXAMPLE 16

The multi-stage power conversion system of any one of the previous examples, wherein the first stage power converter signal comprises the rectified ac current.

EXAMPLE 17

The multi-stage power conversion system of any one of the previous examples, wherein the first stage power converter signal comprises the dc intermediate voltage.

EXAMPLE 18

A method of multi-stage power conversion comprising: converting an alternating current (ac) input power into a direct current (dc) intermediate power using a first power converter stage; providing a network signal via a controllable network; regulating the dc intermediate power in relation to the network signal; converting the dc intermediate power into a dc output power for delivering to a load using a second power converter stage; generating a control signal based upon a load condition; and adjusting the network signal using the control signal.

EXAMPLE 19

The method of example 18, wherein regulating the dc intermediate power in relation to the network signal further comprises: using the first power converter stage to regulate a dc intermediate voltage to a first voltage when the load condition is a burst mode load condition; and using the first power converter stage to regulate the dc intermediate voltage to a second voltage, greater than the first voltage, when the load condition is a continuous conduction mode load condition.

EXAMPLE 20

The method of any one of the previous examples, further comprising: converting the ac input power into a rectified ac input power, the rectified ac input power comprising a rectified ac voltage and a rectified ac current.

EXAMPLE 21

The method of any one of the previous examples, wherein the controllable network is a resistor network, the resistor network comprising a scale factor.

EXAMPLE 22

The method of any one of the previous examples, further comprising: sampling a first power converter stage signal; and multiplying the first power converter stage signal by the scale factor.

EXAMPLE 23

The method of any one of the previous examples, wherein adjusting the network signal using the control signal comprises: adjusting the scale factor using a switch.

EXAMPLE 24

The method of any one of the previous examples, wherein adjusting the scale factor using the switch comprises: controlling the switch using the control signal.

EXAMPLE 25

The method of any one of the previous examples, wherein the first power converter stage signal comprises the rectified ac current.

EXAMPLE 26

The method of any one of the previous examples, wherein wherein the first power converter stage signal comprises the rectified ac voltage.

EXAMPLE 27

The method of any one of the previous examples, wherein the first power converter stage signal comprises the dc intermediate voltage.

EXAMPLE 28

A multi-stage power conversion system comprising a plurality of power converter stages, the plurality of power converter stages comprising: a first power converter stage comprising a controllable network, wherein the first power converter stage is configured to provide a dc intermediate power and to regulate the dc intermediate power in relation to a network signal, and wherein the controllable network is configured to provide the network signal; and a second power converter stage electrically coupled with the first power converter stage and comprising a power estimation circuit, wherein the second power converter stage is configured to provide a dc output power, and wherein the power estimation circuit is electrically coupled with the controllable network so as to adjust the network signal based on an output power condition.

EXAMPLE 29

The multi-stage power conversion system of example 28, wherein the plurality of power converter stages further comprises a third power converter stage electrically coupled in cascade with the first and second power converter stages.

EXAMPLE 30

The multi-stage power conversion system of any one of the previous examples, wherein the second power converter stage comprises a resonant converter.

EXAMPLE 31

The multi-stage power conversion system of any one of the previous examples, wherein the first power converter stage comprises: a first stage power circuit configured to provide the dc intermediate power and to regulate the dc intermediate power in relation to the network signal, the dc intermediate power comprising a dc intermediate voltage.

EXAMPLE 32

The multi-stage power conversion system of any one of the previous examples, wherein the output power condition comprises: a light load condition whereby the second power converter stage operates in a burst mode; and a nominal load condition whereby the second power converter stage operates in a continuous conduction mode.

EXAMPLE 33

The multi-stage power conversion system of any one of the previous examples, wherein the dc output power comprises an output current.

EXAMPLE 34

The multi-stage power conversion system of any one of the previous examples, wherein the first power converter stage regulates the dc intermediate voltage to a first voltage under the light load condition; and the first power converter stage regulates the dc intermediate voltage to a second voltage under the nominal load condition.

EXAMPLE 35

The multi-stage power conversion system of any one of the previous examples, wherein the first voltage is less than the second voltage.

EXAMPLE 36

The multi-stage power conversion system of any one of the previous examples, wherein the second power converter stage is configured to transition the output current from a first current to a second current, the second current greater in magnitude than the first current.

EXAMPLE 37

The multi-stage power conversion system of any one of the previous examples, wherein the controllable network comprises a switch configured to receive a control signal.

EXAMPLE 38

The multi-stage power conversion system of any one of the previous examples, wherein the controllable network comprises a resistor network electrically coupled to the first stage power circuit and configured to provide the network signal.

EXAMPLE 39

The multi-stage power conversion system of any one of the previous examples, wherein the resistor network is configured to sample a first stage power converter signal and to provide the network signal comprising the first stage power converter signal multiplied by a scale factor.

EXAMPLE 40

The multi-stage power conversion system of any one of the previous examples, wherein the switch is configured to adjust the scale factor in response to the control signal.

EXAMPLE 41

The multi-stage power conversion system of any one of the previous examples, wherein the first stage power converter signal comprises the dc intermediate voltage.

The invention claimed is:

1. A multi-stage power conversion system configured to convert an alternating current (ac) input power and to provide a direct current (dc) output power to a load, the multi-stage power conversion system comprising:

a first power converter stage comprising a controllable network, wherein the first power converter stage is configured to convert the ac input power into a dc intermediate power and to regulate the dc intermediate power in relation to a network signal, and wherein the controllable network is configured to provide the network signal based on a control signal; and a second power converter stage electrically coupled in cascade with the first power converter stage and comprising a power estimation circuit, wherein the second power converter stage is configured to convert the dc intermediate power into the dc output power, and wherein the power estimation circuit is configured to provide the control signal in response to a dc output power condition.

2. The multi-stage power conversion system of claim 1, wherein the second power converter stage comprises a resonant converter.

3. The multi-stage power conversion system of claim 1, wherein the first power converter stage comprises:

an alternating current (ac) rectifier configured to receive the ac input power and to convert the ac input power into a rectified ac input power, the rectified ac input power comprising a rectified ac voltage and a rectified ac current; and a first stage power circuit configured to convert the rectified ac input power into the dc intermediate power and to regulate the dc intermediate power in relation to the network signal, the dc intermediate power comprising a dc intermediate voltage.

4. The multi-stage power conversion system of claim 3, further comprising a hold-up capacitor configured to hold the dc intermediate voltage.

5. The multi-stage power conversion system of claim 4, wherein the first stage power circuit comprises a boost power factor correction controller.

6. The multi-stage power conversion system of claim 4, wherein the dc output power condition comprises:

a light load condition whereby the second power converter stage operates in a burst mode; and a nominal load condition whereby the second power converter stage operates in a continuous conduction mode.

7. The multi-stage power conversion system of claim 6, wherein the first power converter stage is configured to regulate the dc intermediate power with a high output impedance under the light load condition and the second power converter stage is configured to receive the dc intermediate power from the hold-up capacitor.

8. The multi-stage power conversion system of claim 6, wherein the first power converter stage is configured to regulate the dc intermediate voltage to a first voltage under the light load condition; and wherein the first power converter stage is configured to regulate the dc intermediate voltage to a second voltage under the nominal load condition.

9. The multi-stage power conversion system of claim 8, wherein the first voltage is less than the second voltage.

10. The multi-stage power conversion system of claim 6, wherein the controllable network comprises a switch configured to receive the control signal.

11. The multi-stage power conversion system of claim 10, further comprising an inrush protection circuit configured to reduce an inrush of the rectified ac current, wherein the switch is configured to bypass the inrush protection circuit under the light load condition.

12. The multi-stage power conversion system of claim 10, wherein the controllable network comprises a resistor network electrically coupled to the first stage power circuit and configured to provide the network signal.

13. The multi-stage power conversion system of claim 12, wherein the resistor network is configured to sample a first stage power converter signal and to provide the network signal comprising the first stage power converter signal multiplied by a scale factor.

14. The multi-stage power conversion system of claim 13, wherein the switch is configured to adjust the scale factor in response to the control signal.

15. The multi-stage power conversion system of claim 13, wherein the first stage power converter signal comprises the rectified ac voltage.

16. The multi-stage power conversion system of claim 13, wherein the first stage power converter signal comprises the rectified ac current.

17. The multi-stage power conversion system of claim 13, wherein the first stage power converter signal comprises the dc intermediate voltage.

18. A method of multi-stage power conversion comprising:
converting an alternating current (ac) input power into a direct current (dc) intermediate power using a first power converter stage;
providing a network signal via a controllable network;
regulating the dc intermediate power in relation to the network signal;
converting the dc intermediate power into a dc output power for delivering to a load using a second power converter stage;
generating a control signal based upon a load condition; and
adjusting the network signal using the control signal.

19. The method of claim 18, wherein regulating the dc intermediate power in relation to the network signal further comprises:
using the first power converter stage to regulate a dc intermediate voltage to a first voltage when the load condition is a burst mode load condition; and
using the first power converter stage to regulate the dc intermediate voltage to a second voltage, greater than the first voltage, when the load condition is a continuous conduction mode load condition.

20. The method of claim 19, further comprising:
converting the ac input power into a rectified ac input power, the rectified ac input power comprising a rectified ac voltage and a rectified ac current.

21. The method of claim 20, wherein the controllable network is a resistor network, the resistor network comprising a scale factor.

22. The method of claim 21, further comprising:
sampling a first power converter stage signal; and
multiplying the first power converter stage signal by the scale factor.

23. The method of claim 22, wherein adjusting the network signal using the control signal comprises: adjusting the scale factor using a switch.

24. The method of claim 23, wherein adjusting the scale factor using the switch comprises: controlling the switch using the control signal.

25. The method of claim 22, wherein the first power converter stage signal comprises the rectified ac current.

26. The method of claim 22, wherein the first power converter stage signal comprises the rectified ac voltage.

27. The method of claim 22, wherein the first power converter stage signal comprises the dc intermediate voltage.

28. A multi-stage power conversion system comprising a plurality of power converter stages, the plurality of power converter stages comprising:
a first power converter stage comprising a controllable network, wherein the first power converter stage is configured to provide a dc intermediate power and to regulate the dc intermediate power in relation to a network signal, and wherein the controllable network is configured to provide the network signal; and
a second power converter stage electrically coupled with the first power converter stage and comprising a power estimation circuit, wherein the second power converter stage is configured to provide a dc output power, and wherein the power estimation circuit is electrically coupled with the controllable network so as to adjust the network signal based on an output power condition.

29. The multi-stage power conversion system of claim 28, wherein the plurality of power converter stages further comprises a third power converter stage electrically coupled in cascade with the first and second power converter stages.

30. The multi-stage power conversion system of claim 28, wherein the second power converter stage comprises a resonant converter.

31. The multi-stage power conversion system of claim 28, wherein the first power converter stage comprises:
a first stage power circuit configured to provide the dc intermediate power and to regulate the dc intermediate power in relation to the network signal, the dc intermediate power comprising a dc intermediate voltage.

32. The multi-stage power conversion system of claim 31, wherein the output power condition comprises:
a light load condition whereby the second power converter stage operates in a burst mode; and
a nominal load condition whereby the second power converter stage operates in a continuous conduction mode.

33. The multi-stage power conversion system of claim 32, wherein the dc output power comprises an output current.

34. The multi-stage power conversion system of claim 33, wherein the first power converter stage regulates the dc intermediate voltage to a first voltage under the light load condition; and
wherein the first power converter stage regulates the dc intermediate voltage to a second voltage under the nominal load condition.

35. The multi-stage power conversion system of claim 34, wherein the first voltage is less than the second voltage.

36. The multi-stage power conversion system of claim 35, wherein the second power converter stage is configured to transition the output current from a first current to a second current, the second current greater in magnitude than the first current.

37. The multi-stage power conversion system of claim 36, wherein the controllable network comprises a switch configured to receive a control signal.

38. The multi-stage power conversion system of claim 37, wherein the controllable network comprises a resistor network electrically coupled to the first stage power circuit and configured to provide the network signal.

39. The multi-stage power conversion system of claim 38, wherein the resistor network is configured to sample a first stage power converter signal and to provide the network signal comprising the first stage power converter signal multiplied by a scale factor.

40. The multi-stage power conversion system of claim 39, wherein the switch is configured to adjust the scale factor in response to the control signal.

41. The multi-stage power conversion system of claim 40, wherein the first stage power converter signal comprises the dc intermediate voltage.

* * * * *